United States Patent
Wood et al.

(10) Patent No.: US 8,308,112 B2
(45) Date of Patent: Nov. 13, 2012

(54) PLASMA ACTUATORS FOR DRAG REDUCTION ON WINGS, NACELLES AND/OR FUSELAGE OF VERTICAL TAKE-OFF AND LANDING AIRCRAFT

(75) Inventors: Tommie L. Wood, Arlington, TX (US); Thomas C. Corke, Granger, IN (US); Martiqua Post, Colorad Springs, CO (US)

(73) Assignees: Textron Innovations Inc., Providence, RI (US); The University of Notre Dame du Lac, Notre Dame, IN (US)

( * ) Notice: Subject to any disclaimer, the term of this patent is extended or adjusted under 35 U.S.C. 154(b) by 275 days.

(21) Appl. No.: 11/519,770

(22) Filed: Sep. 13, 2006

(65) Prior Publication Data
US 2010/0224733 A1    Sep. 9, 2010

Related U.S. Application Data

(60) Provisional application No. 60/726,648, filed on Oct. 17, 2005.

(51) Int. Cl.
*B64C 21/00* (2006.01)
*B64C 23/00* (2006.01)

(52) U.S. Cl. .................................. 244/205; 244/203

(58) Field of Classification Search ............... 244/199.1, 244/201, 203, 204, 205, 207
See application file for complete search history.

(56) References Cited

U.S. PATENT DOCUMENTS

| | | | |
|---|---|---|---|
| 4,914,741 A * | 4/1990 | Brown et al. | 257/668 |
| 5,414,324 A | 5/1995 | Roth et al. | |
| 5,456,594 A * | 10/1995 | Yap | 431/1 |
| 6,200,539 B1 | 3/2001 | Sherman | |
| 6,247,671 B1 * | 6/2001 | Saeks et al. | 244/205 |
| 6,480,142 B1 * | 11/2002 | Rubin | 342/26 R |
| 6,570,333 B1 * | 5/2003 | Miller et al. | 315/111.21 |
| 6,796,532 B2 * | 9/2004 | Malmuth et al. | 244/204 |
| 6,805,325 B1 * | 10/2004 | Malmuth et al. | 244/205 |
| 7,017,863 B2 * | 3/2006 | Scott et al. | 244/205 |
| 7,066,431 B2 * | 6/2006 | Scott et al. | 244/134 D |
| 7,380,756 B1 * | 6/2008 | Enloe et al. | 244/175 |

(Continued)

FOREIGN PATENT DOCUMENTS
WO    02/081304    10/2002

OTHER PUBLICATIONS

"Separation Control Over Low Pressure Turbine Blades Using Plasma Actuators" Huang, Junhui, Apr. 2005, retrieved from http://etd.nd.edu/ETD-db/theses/available/etd-04152005-095454/unrestricted/HuangJ042005.pdf.*

(Continued)

*Primary Examiner* — Joseph W Sanderson
(74) *Attorney, Agent, or Firm* — Pillsbury Winthrop Shaw Pittman LLP

(57) ABSTRACT

An aircraft includes a surface over which an airflow passes. A plasma actuator is configured to generate a plasma above the surface, the plasma coupling a directed momentum into the air surrounding the surface to reduce separation of the airflow from the surface. A method of reducing separation of an airflow from a surface of an aircraft includes generating a plasma in air surrounding the surface at a position where the airflow would separate from the surface in the absence of the plasma.

23 Claims, 41 Drawing Sheets

U.S. PATENT DOCUMENTS 7,413,149 B2 * 8/2008 Minick et al. ................. 244/205
2005/0007726 A1 * 1/2005 Schlitz et al. ................. 361/330

OTHER PUBLICATIONS

International Search Report issued in PCT/US2006/032247, dated Oct. 25, 2007, 5 pages.

Written Opinion of the International Search Authority in PCT/US2006/032247, dated Oct. 25, 2007, 7 pages.

Martiqua L. Post, Plasma Actuators for Separation Control on Stationary and Oscillating Airfoils, a Dissertation submitted to the Graduate School of the University of Notre Dame, Department of Aerospace and Mechanical Engineering, May 2004, Notre Dame, Indiana.

* cited by examiner

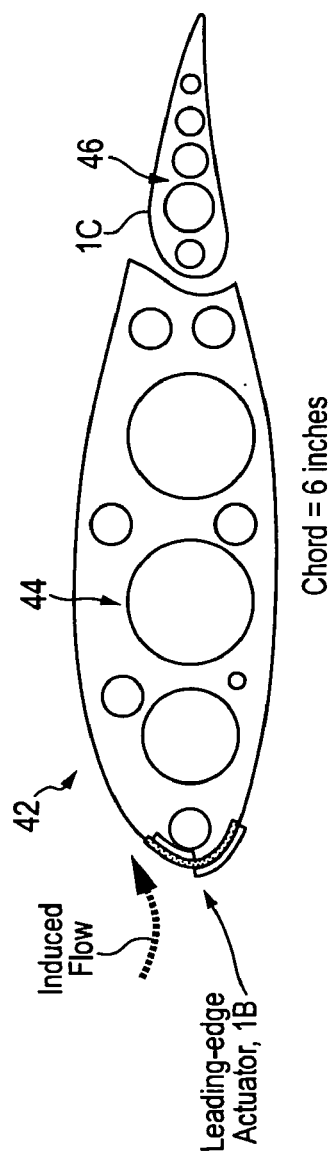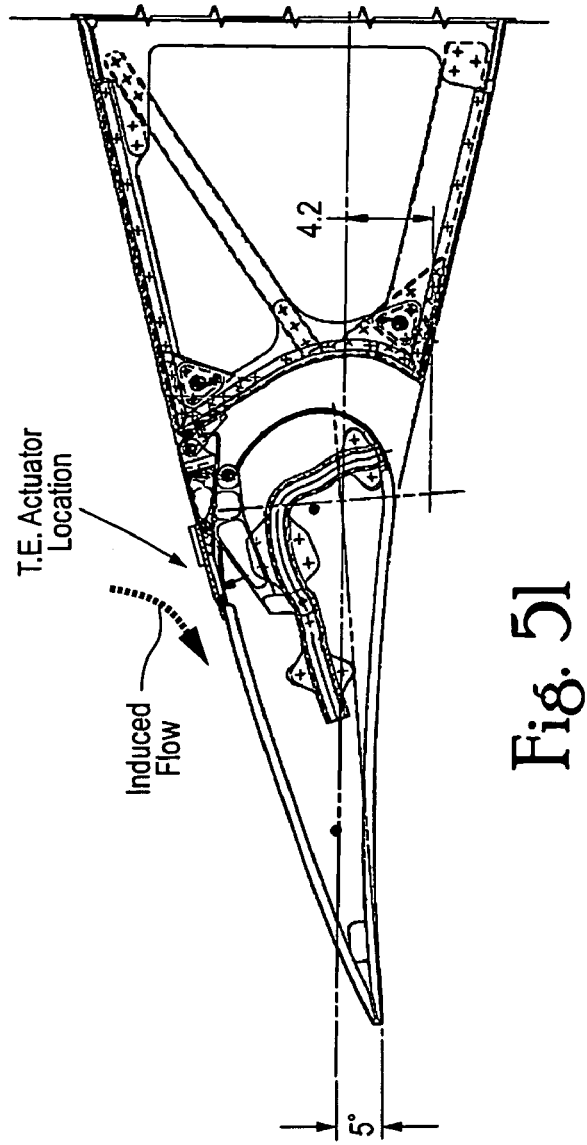

Actuators Off

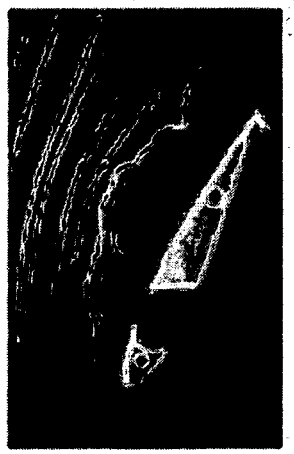
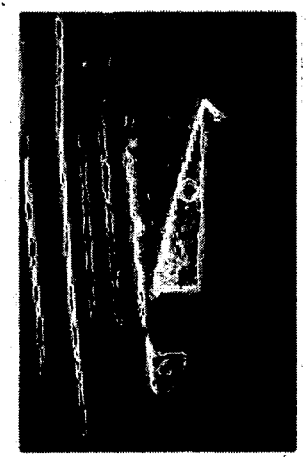
Fig. 9o  Fig. 9p  Fig. 9q

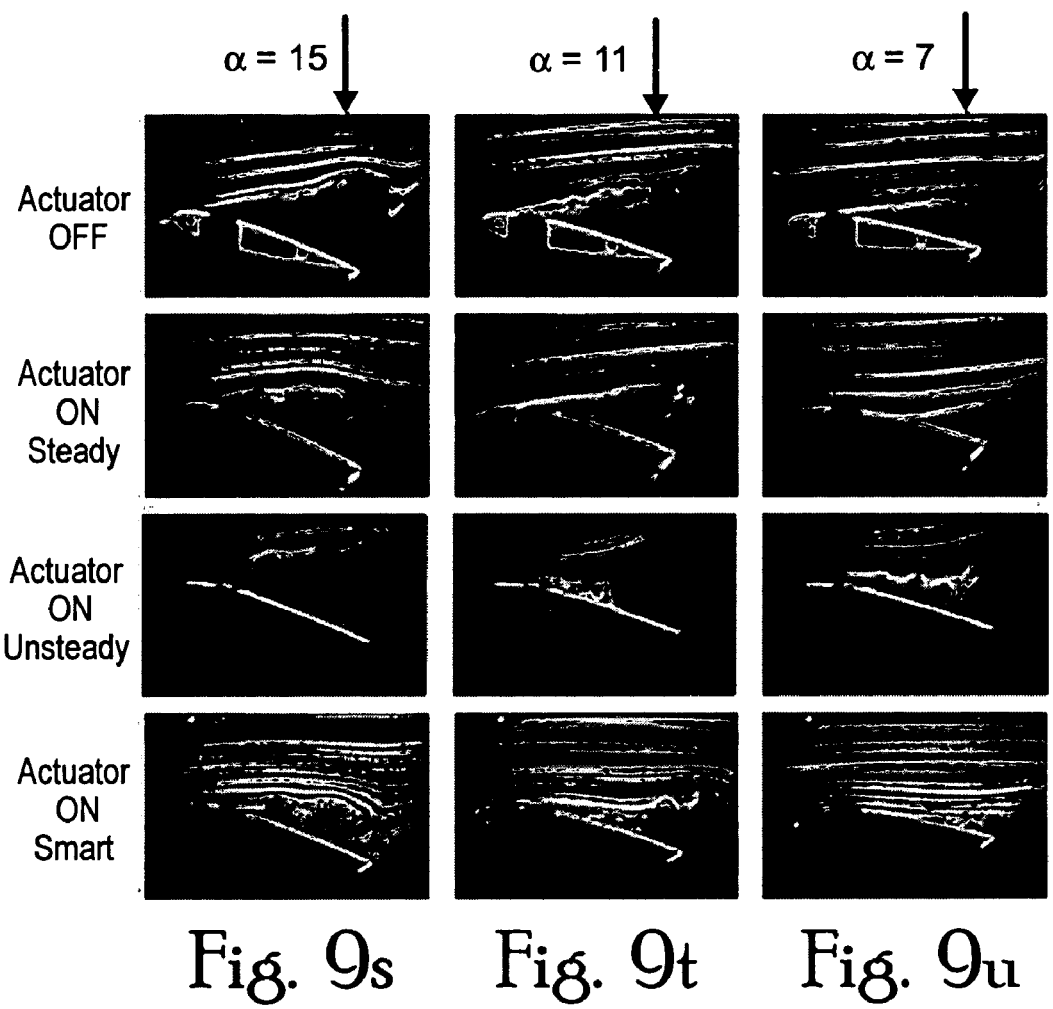

PLASMA ACTUATORS FOR DRAG REDUCTION ON WINGS, NACELLES AND/OR FUSELAGE OF VERTICAL TAKE-OFF AND LANDING AIRCRAFT

CROSS REFERENCE TO RELATED APPLICATION

This application claims priority to U.S. Application 60/726,648, filed Oct. 17, 2005, the entire contents of which are incorporated herein by reference.

STATEMENT REGARDING FEDERALLY SPONSORED RESEARCH

The present invention was developed in accordance with Agreement DABT 63-00-3-001 between Bell Helicopter Textron Inc. and the Defense Advanced Research Projects Agency.

BACKGROUND OF THE INVENTION

1. Field of the Invention

The present invention relates to the use of single-dielectric barrier discharge plasma actuators for drag reduction on wings, nacelles and/or fuselage of aerodynamic vehicles designed for vertical take-off and landing (VTOL).

2. Description of the Related Art

Aircraft may include surfaces that have regions where the airflow over the surface is not able to follow the contour of the surface. The airflow is said to "separate" from the surface in these regions. The separation of the airflow from the surface may result in increased fuel consumption, reductions and/or limitations on travel speed and/or range, and the carrying capacity of the aircraft. For example, in airplanes that take-off vertically like a helicopter and then change configuration to fly as a normal airplane, i.e. tilt-rotor airplanes, the separation of the airflow from the rotor on the wing during take-off results in resistance to the upward motion of the wing, also known as download, and to a reduction of the carrying capacity and operational range of the tilt-rotor airplane.

Previous attempts to prevent airflow separation included blowing and/or suctioning air from orifices in the surface located in or near the separated flow region. Slots were formed in the surface and jets of pulsating air were periodically discharged from the slots to prevent airflow separation. The jets were formed by voice coil based actuators or piezoelectric actuators provided in a linear array along the surface.

The use of voice coil based actuators or piezoelectric actuators to prevent airflow separation required a change in the design of the surface to accommodate the actuators. The voice coil based actuators or piezoelectric actuators added weight and expense to the aircraft from the slot, actuators and wires. It was also difficult to retrofit the voice coil based actuators or piezoelectric actuators to existing aircraft. Use of such actuators on rotor blades required that they fit within the contour of the airfoil. To generate pulsating jets of air required a vibrating membrane of some construction which results in airframe noise and vibration in addition to the volume requirement inside the lifting elements.

SUMMARY OF THE INVENTION

According to an aspect of the invention, an aircraft includes a surface over which an airflow passes. A plasma actuator is configured to generate a plasma above/at the surface, the plasma coupling a directed momentum into the air surrounding the surface to reduce separation of the airflow from the surface.

According to another aspect of the invention, a method of reducing separation of an airflow from a surface of an aircraft includes generating a plasma in air surrounding the surface at a position where the airflow would separate from the surface in the absence of the plasma.

BRIEF DESCRIPTION OF THE DRAWINGS

Embodiments of the present invention will be described below in reference to the accompanying drawings, in which like reference characters represent like features, wherein:

FIGS. 5k-5m illustrate an airfoil of the aircraft of FIG. 5j;

FIGS. 9o-9q are flow visualizations over the airfoil when the plasma actuator is off and when the plasma actuator is operated in the unsteady mode at the second forcing frequency;

FIGS. 9s-9u are flow visualizations over the airfoil when the plasma actuator is off, when the plasma actuator is operated in the steady mode, when the plasma actuator is operated in the unsteady mode, and when the plasma actuator is operated in smart mode for various angles of attack during the pitch down portion of the oscillatory cycle.

DETAILED DESCRIPTION

Figure 1:
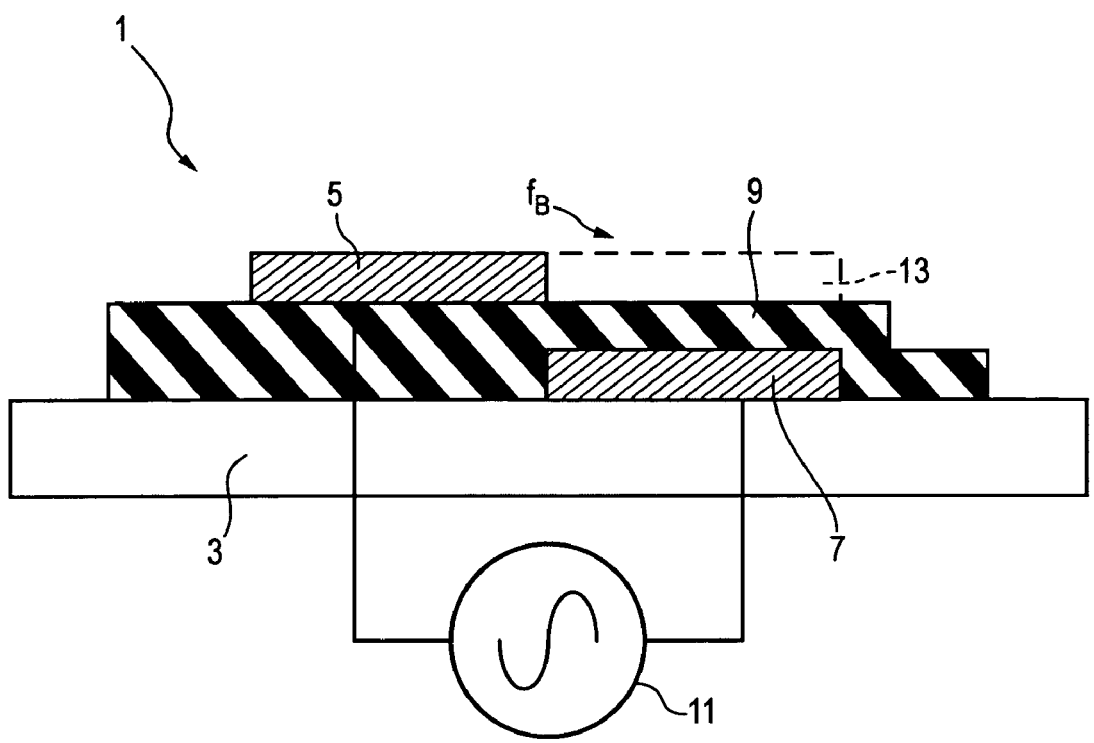
FIG. 1 is a schematic illustration of a plasma actuator in a chordwise cross section according to an embodiment of the present invention.

Referring to FIG. 1, a single-dielectric barrier discharge plasma actuator 1 is attached to a surface 3 of an VTOL aircraft. The actuator 1 may be attached to the surface 3 in a region in which airflow separates from the surface 3. The plasma actuator 1 includes a exposed electrode 5, a covered, insulated electrode 7 and a dielectric 9. An alternating current (AC) voltage source 11 is connected between the electrodes 5 and 7. Although the actuator 1 is shown in FIG. 1 as extending from the surface 3, it should be appreciated that the actuator 1 may be provided in a recess in the surface 3 so as to be partially or completely flush with the surface 3. The electrodes 5 and 7 may be formed of conductive material, for example copper foil. The dielectric 9 may be formed of an electrically insulating material, for example KAPTON® polyimide tape. The thickness of the dielectric is dependent on the maximum voltage that will be applied to the plasma actuator 1. Polyimide tape is thin and flexible, but degrades over time due to ozone generation in plasma. The dielectric 9 may also be a ceramic, such as MACOR®, which is machinable and may last indefinitely. A dielectric formed of ceramic would need to be thicker than a dielectric formed of polyimide tape and be machined to its final shape. The dielectric 9 may also be, but is not limited to, PEEK® film, which is thin and flexible and not affected by ozone. PEEK® film also resists erosion caused by water.

The application of high voltage by the voltage source 11 causes air to ionize and creates a plasma. When the AC voltage is applied, a plasma discharge appears on the surface of the dielectric 9 above the covered electrode 7 and directed momentum is coupled into the surrounding air. The momentum coupling alters the airflow over the actuator 1. The plasma in the presence of an electric field gradient E results in a body force vector $f_B$ that acts on the airflow, as shown in FIG. 1. The body force is a body force per volume of plasma that varies in time and space during the AC voltage cycle. The body force vector $f_B$ is defined by: $f_B = \rho_c E$, where $\rho_c$ is the charge density of the plasma and E is the electric field gradient. Using the Boltzmann relationship, and substituting for $\rho_c$, the body force vector can be rewritten as $f_B = -(\in_0/\lambda_D^2)\phi E$, where $\in_0$ is the permittivity of the free space, $\lambda_D$ is the Debye length (i.e. the characteristic length for electrostatic shielding in plasma), and $\phi$ is the electric potential. From this equation, it is clear that the body force from the plasma actuator 1 decreases with decreasing plasma density, i.e. increasing Debye length.

Referring again to FIG. 1, the exposed electrode 5 and the covered electrode 7 are overlapped by a small amount in order to produce a more uniform plasma in the full spanwise direction of the surface 3. If no overlap were provided, the air gap between the electrodes 5 and 7 would break down at the applied voltage before the dielectric 9. At atmospheric pressure, almost any available dielectric material has a dielectric strength and breakdown voltage superior to air. Air gaps should therefore be avoided in the design of the plasma actuator. If an air gap is present, the result would be spanwise non-uniformities in the plasma and failure of the plasma actuator.

The plasma actuator 1 of FIG. 1 is a single dielectric barrier discharge (SDBD) plasma actuator. The SDBD plasma actuator is stable at atmospheric pressure because it is self limiting at atmospheric pressure due to charge accumulation on the surface of the dielectric 9. The behavior of the plasma actuator 1 is primarily determined by the build up of charge on the covered, insulated electrode 7. When the AC voltage source 11 applies an AC voltage, a plasma discharge appears on the surface of the dielectric 9 above the covered, insulated electrode 7 and directed momentum, defined by the body force vector $f_B$, is coupled to the surrounding air. The body force vector $f_B$ can be tailored for a given application through the orientation and design of the geometry of the electrodes 5 and 7. For example, the electrodes 5 and 7 can be designed to produce upstream or downstream oriented wall jets or streamwise vortices.

Although the plasma is composed of charged particles, it is net neutral because it is created by the ionization of neutral air and an equal number of negative electrons and positive ions exist in the plasma. The charged particles respond to the external electric field and the electrons move to the positive electrode and the positive ions move to the negative electrode. This movement results in an imbalance of charges on the edges of the plasma that sets up an electric field in the plasma that is opposite to the externally applied electric field. The imbalance of charges on the edges of the plasma is due to the thermal motion of the charged particles in the plasma. The rearrangement of the charged particles continues until the net electric field in the plasma is neutralized.

Figure 2A:
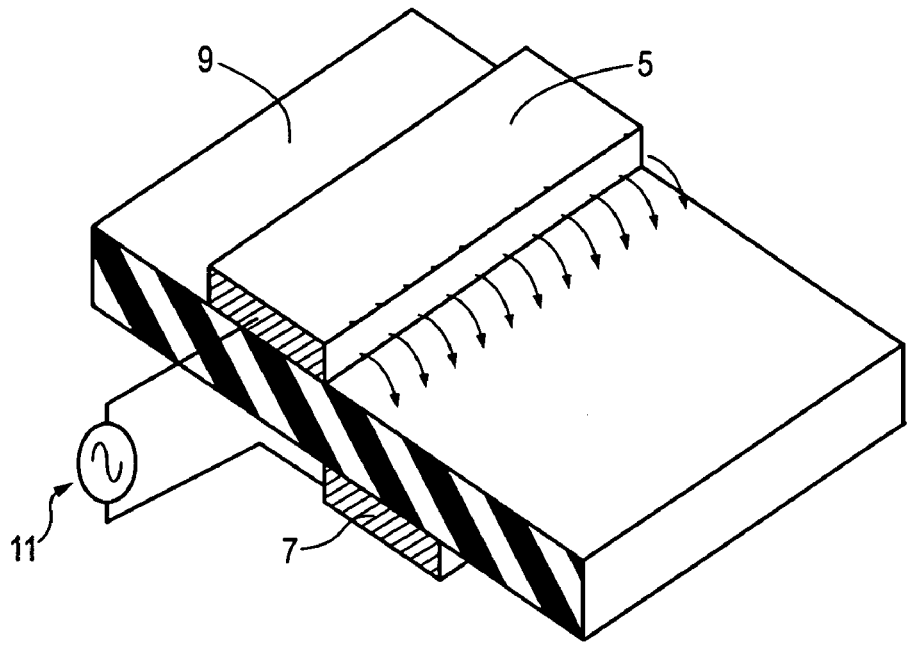
FIGS. 2a and 2b are a schematic illustration of the single dielectric barrier discharge of the plasma actuator of FIG. 1 during half-cycles of the applied voltage waveform.
Figure 2B:
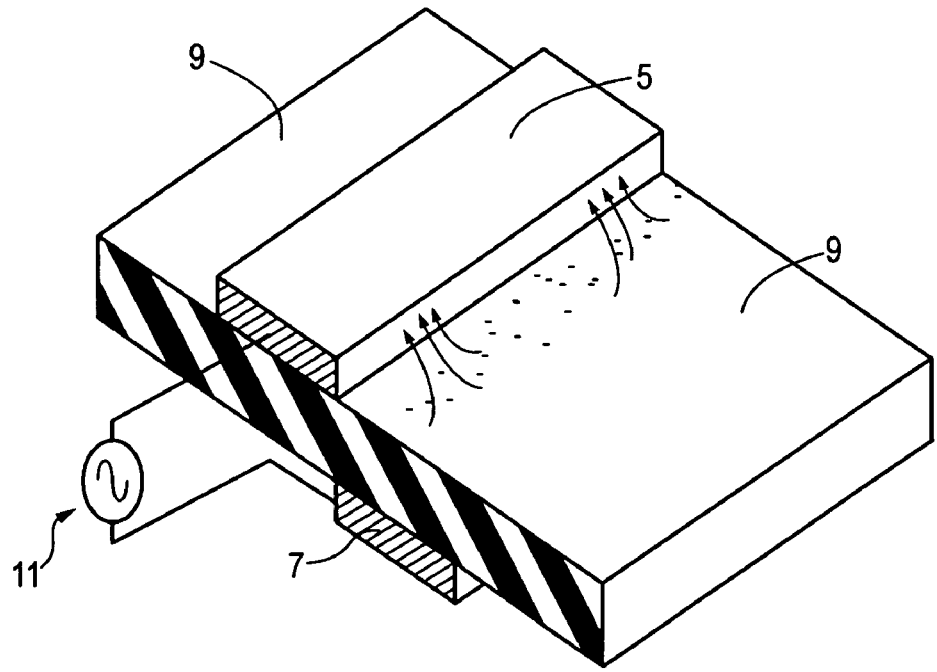

Referring to FIGS. 2a and 2b, the plasma is formed as a result of a series of discharges as electrons are transferred onto and off the surface of the dielectric 9. As shown in FIG. 2a, when the applied voltage is negative, electrons move from the exposed electrode 5 to the dielectric 9. As shown in FIG. 2b, when the applied voltage is positive, electrons move from the dielectric 9 to the exposed electrode 5. The build up of charge on the surface of the dielectric 9 is the reason that the discharge is self limiting and does not collapse into a constricted arc. Based on the energies, the electrons penetrate at most a few monolayers of the dielectric 9. Due to the low conductivity of the dielectric 9 the electrons generally remain at the location where they are deposited. The portion of the dielectric 9 that collects and includes the immobile electrons acts as a virtual electrode 13, as shown in FIG. 1, in addition to the two electrodes 5 and 7 of the plasma actuator 1.

FIG. 2a represents the half cycle of the discharge for which the exposed electrode 5 is more negative than the surface of the dielectric 9 and the covered, insulated electrode 7. The exposed electrode 5 thus acts as a cathode in the discharge. If the applied voltage is high enough, the exposed electrode 5 can emit electrons. Because the discharge terminates on the surface of the dielectric 9, the build up of the charge on the surface of the dielectric 9 opposes the voltage applied by the source 11, and the discharge shuts itself off unless the magnitude of the applied voltage is continually increased. The behavior of the discharge is similar on the opposite half cycle shown in FIG. 2b and a positive slope in the applied voltage is necessary to maintain the discharge. In the opposite half cycle shown in FIG. 2b, the surface of the dielectric 9 acts as the cathode. During the half cycle shown in FIG. 2b, the charge available to the discharge is limited to the charge deposited during the half cycle shown in FIG. 2a.

Figure 2C:
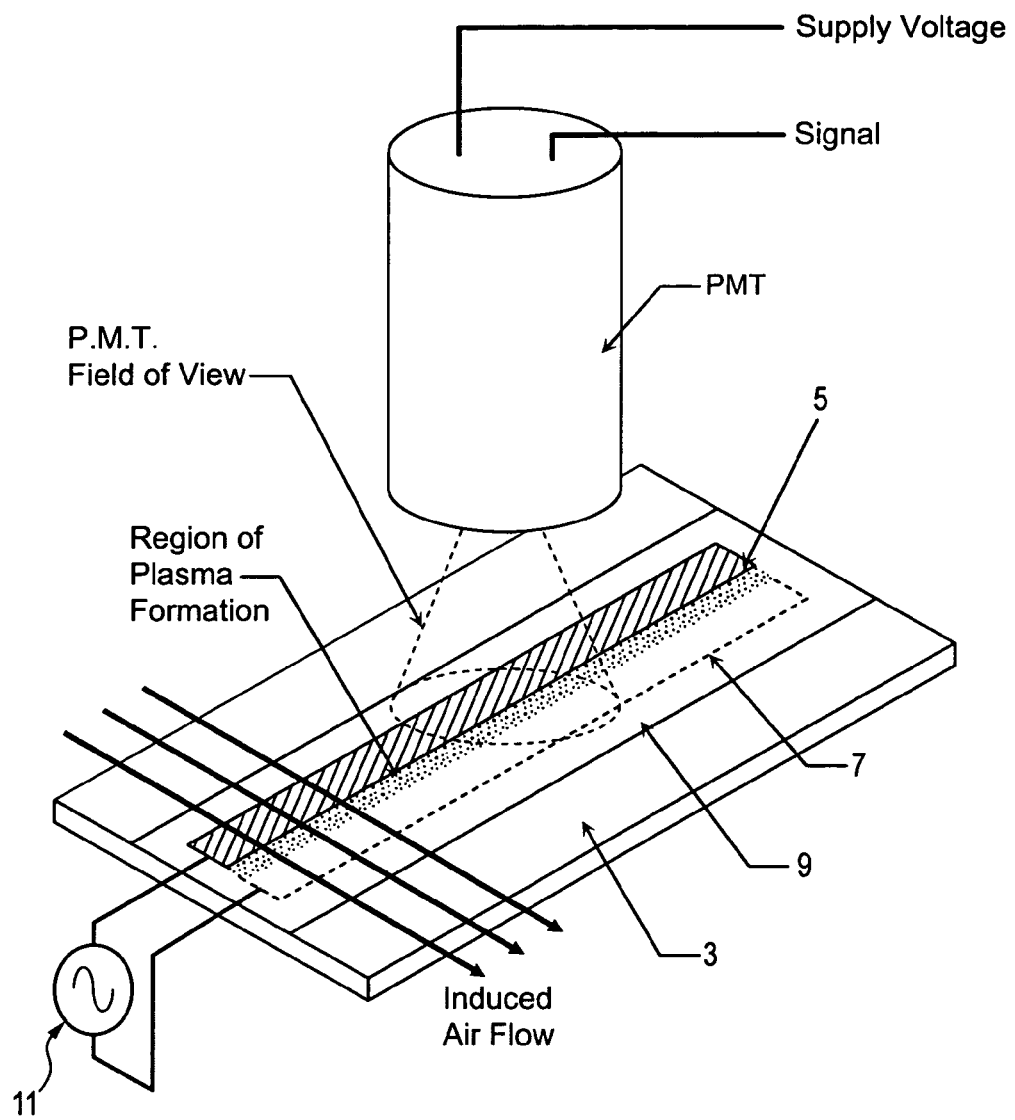
FIG. 2c is a schematic illustration of a photomultiplier tube arrangement used to measure light emissions from the plasma actuator.
Figure 2D:
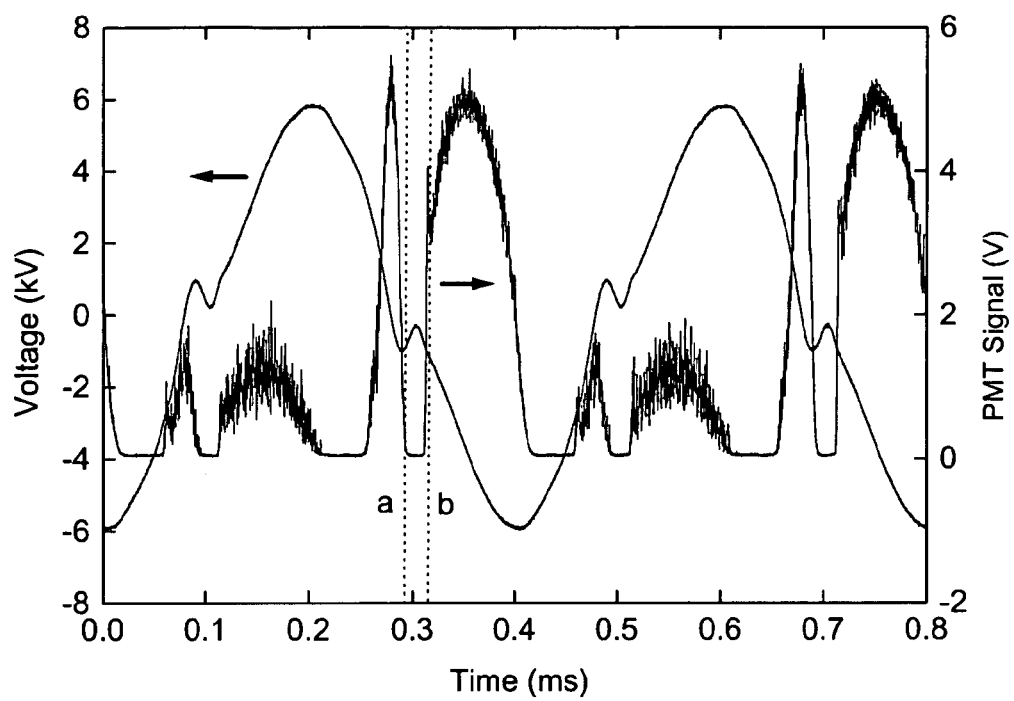
FIG. 2d is an illustration of the light emission from the plasma actuator as a function of the applied voltage.

Referring to FIG. 2c, a photomultiplier tube (PMT) may be used to observe the bulk plasma with high time resolution. The light emissions observed by the PMT are proportional to the dissipated current in the plasma. For the results shown in FIGS. 2d and 2e, the PMT was arranged to observe approximately one third of the length of the plasma actuator 1. FIG. 2d shows two cycles of a plasma discharge that turns on and off during each cycle of the applied voltage. At point "a" in the figure, due to some impedance mismatch in the driving circuit that applies the AC voltage, there is a momentary reversal in the slope of the applied waveform. Because the applied voltage is no longer becoming more negative, the discharge shuts off. At the point "b" in the figure, the applied voltage again resumes a negative course and the discharge reignites and stays ignited until the slope of the voltage waveform goes to zero, at approximately t=0.4 ms in this example.

Figure 2E:
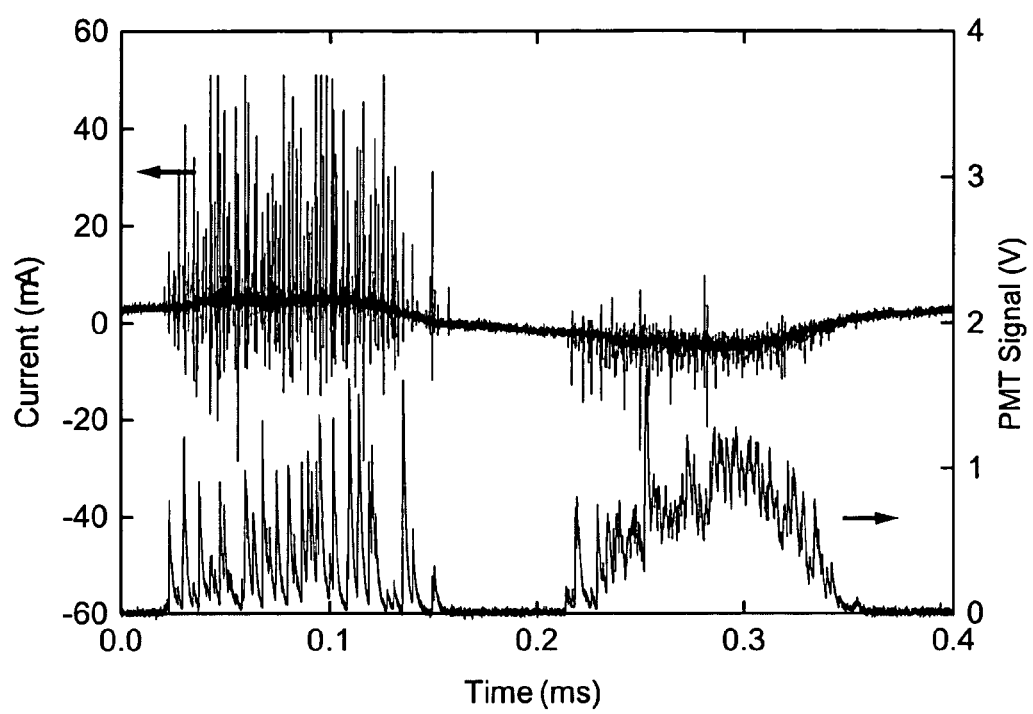
FIG. 2e is an illustration of the light emission from the plasma actuator as a function of the applied current.
Figure 2F:
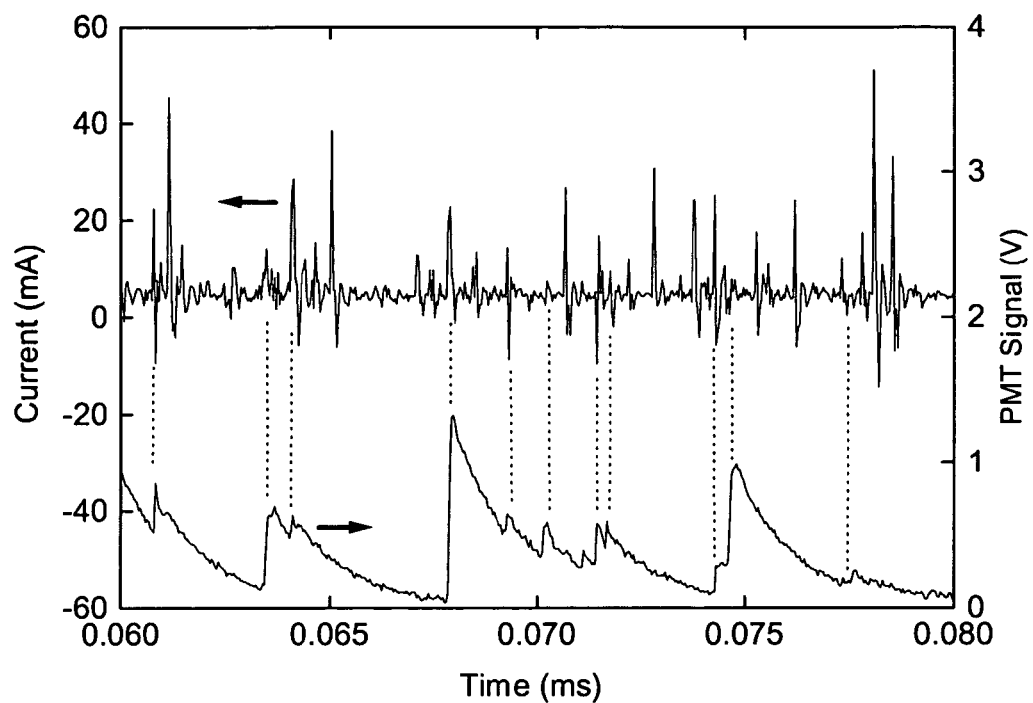
FIG. 2f is a more detailed illustration of the light emission of FIG. 2e.

FIG. 2e shows one discharge cycle of the plasma actuator 1 with a sinusoidal applied voltage waveform. As shown in the figure, the discharge is more irregular on the positive-going half cycle than the negative-going half cycle. FIG. 2f shows same data as FIG. 2e on a finer timescale. As shown in FIG. 2f, each pulse of light observed by the PMT corresponds to a pulse in the current signal. However, not every current pulse corresponds to a light pulse. This is due to the fact that the PMT only observes one third of the plasma actuator 1, while the current monitor measures the current during the entire discharge. There are discharges that do not occur in the PMT's field of view. When the voltage on the exposed electrode 5 is negative-going, the discharge is relatively uniform across the width of the plasma actuator 1. When the voltage is positive-going, the discharge is irregular, or "patchy." The asymmetry in the discharge affects the efficiency of the momentum coupling to the flow, as described below.

Figure 2G:
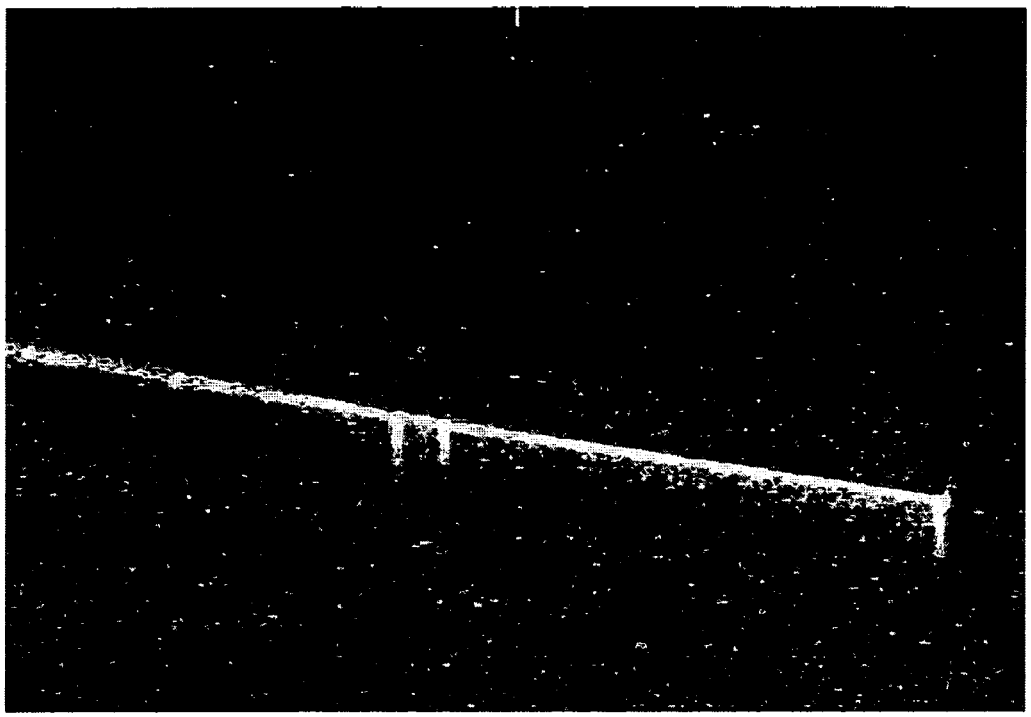
FIG. 2g is a photograph of the plasma generated by the plasma actuator.
Figure 2H:
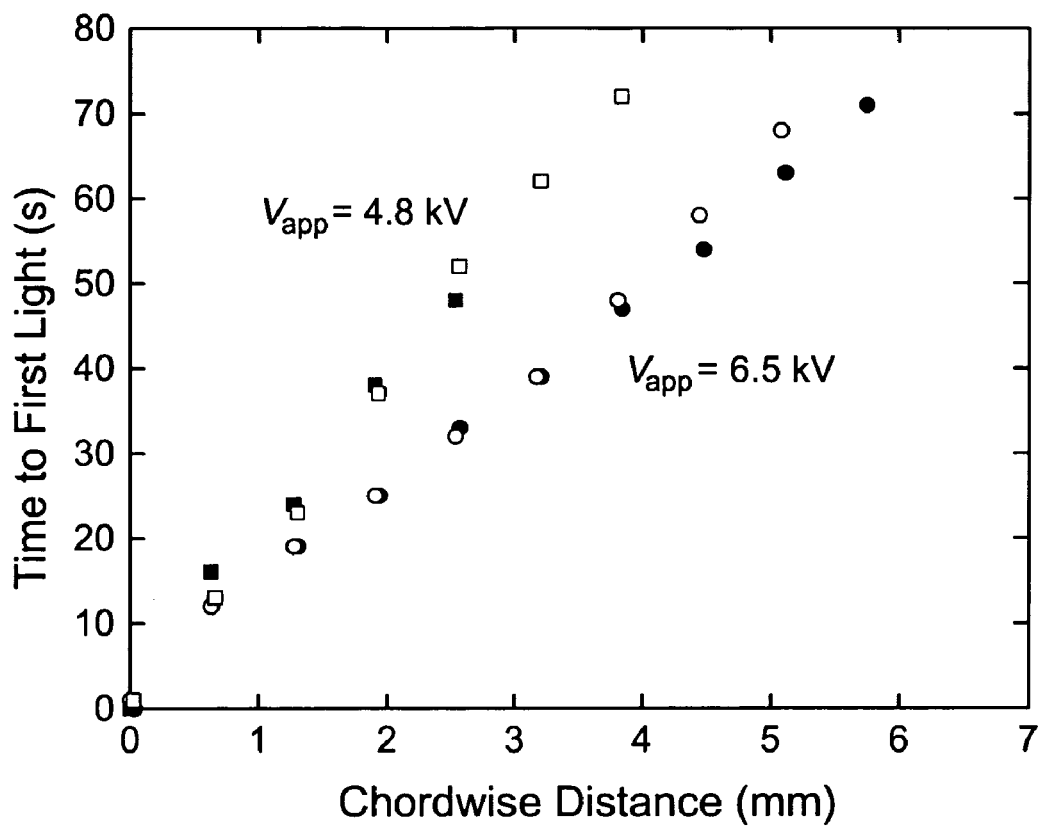
FIG. 2h is an illustration of the time to first light of the plasma as a function of the lateral (chordwise) distance of the plasma actuator.
Figure 2I:
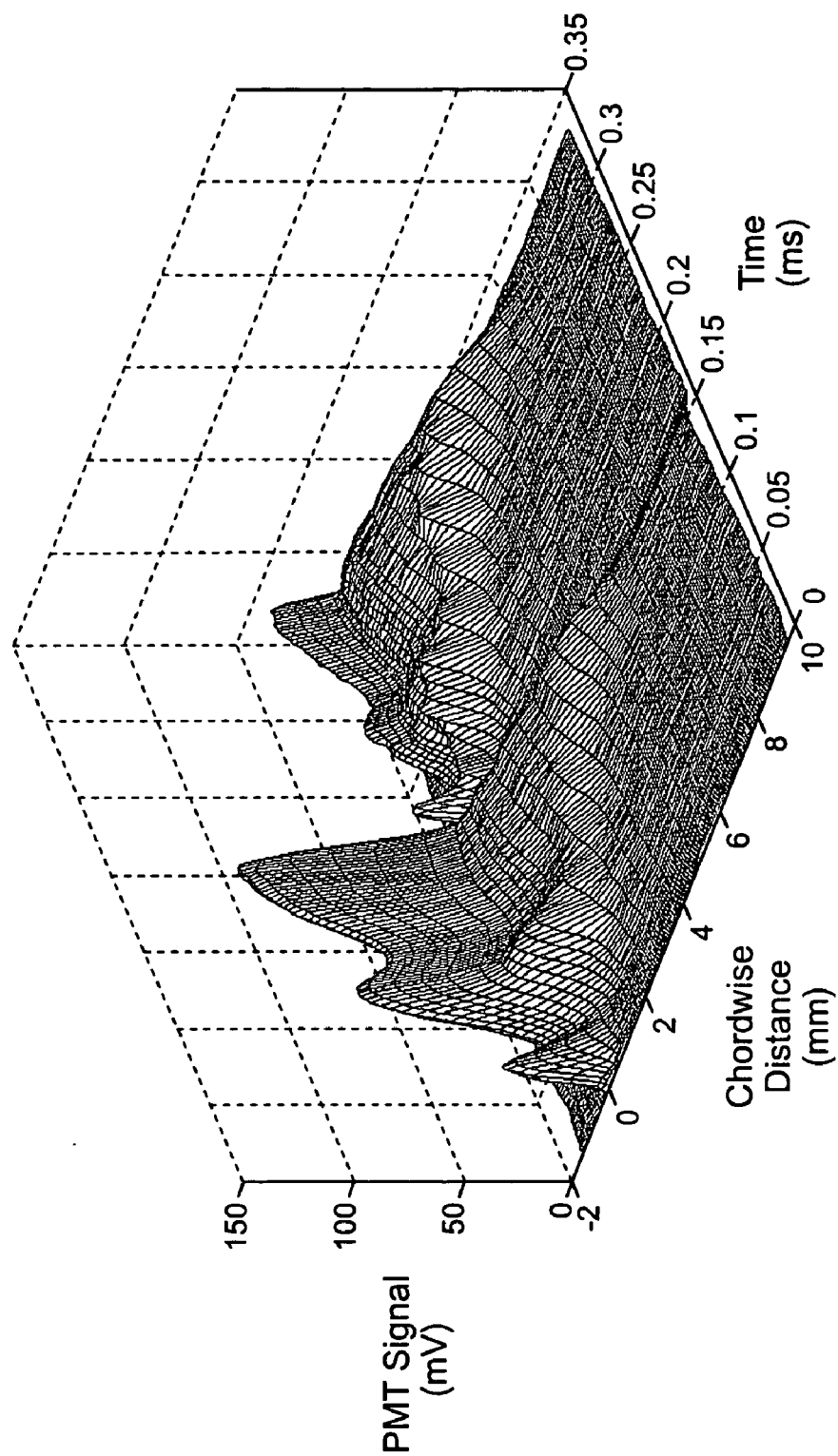
FIG. 2i is a surface plot of the light emission of the plasma actuator.

FIG. 2g shows an "open shutter" view of the plasma (i.e. the shutter speed is longer than the period of the applied voltage waveform). FIG. 2g appears to show a plasma density gradient because the plasma nearest the edge of the exposed electrode 5 is brightest. However, FIG. 2h shows the relative time to first light as a function of lateral position of an aperture interposed between the plasma and the PMT. As shown in the FIG. 2h, the plasma grows in the lateral (i.e. chordwise) direction at a constant rate. The plasma near the edge of the exposed electrode 5 thus appears brighter due to its having emitted for a greater fraction of the discharge cycle, not because of a higher plasma density. It is also shown in FIG. 2h that the higher the applied voltage, the faster the plasma discharge spreads along the surface of the dielectric 7. The propagation speed of the plasma discharge is also essentially the same for both the negative-going and positive-going half cycles for a given voltage. For both half-cycles, the discharge ignites at the edge of the exposed dielectric 7 and propagates along the surface of the dielectric 7. Although there is a difference in the transverse (spanwise) structure of the plasma between half-cycles of the discharge, as shown in FIGS. 2e and 2f, the lateral (chordwise) extent and development of the plasma is essentially the same. A surface plot of the light emission of the plasma as seen by the PMT is shown in FIG. 2i.

Figure 3:
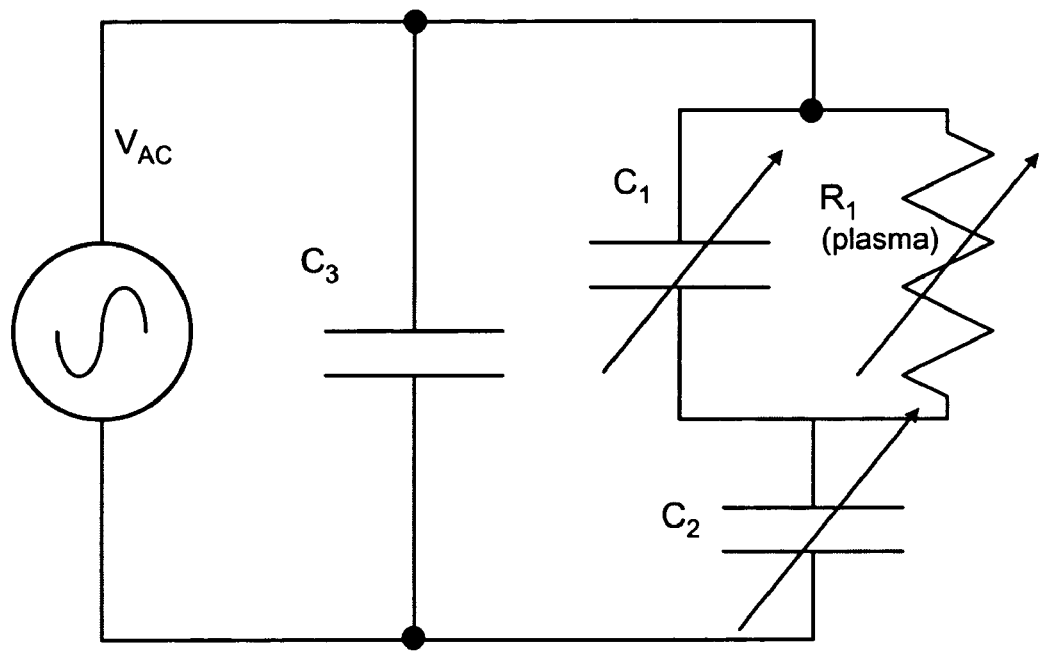
FIG. 3 is a circuit model of the plasma actuator of FIG. 1.

Referring to FIG. 3, the plasma actuator 1 may be modeled as an electric circuit. The capacitor C1 represents the capacitance between the exposed electrode 5 and the virtual electrode 13. The capacitor C2 represents the capacitance between the virtual electrode 13 and the covered, insulated electrode 7. Because the electrodes 5 and 7 are offset, a capacitance C3 is included because some field lines connect the electrodes 5 and 7 directly. The capacitance C3 provides a parallel path for additional displacement current in the circuit, but does not affect the discharge.

Because the chordwise extent of the plasma changes during the discharge, the capacitances C1 and C2 are represented as variable. For purposes of this model, the values of C1 and C2 may be considered as average capacitances that depend on the amplitude of the applied AC voltage. The plasma is represented as a resistor R1 because it is the single dissipative element in the circuit. The plasma does not exist during the entire discharge and is thus represented as a variable resistor. When the absolute value of the potential difference across capacitor C1 exceeds a threshold value, the plasma ignites and the resistance R1 drops from an effectively infinite, open-circuit value to a low value. When the absolute value of the potential difference falls below another threshold, the discharge quenches and the resistance R1 returns to its open circuit value. The application of the AC voltage 11 to the plasma actuator 1 allows the discharge to be sustained. The circuit models for the actuator are used to model the actuator effect in fluid flow. The circuit models may also be used to improve the performance of the actuator.

Figure 4A:
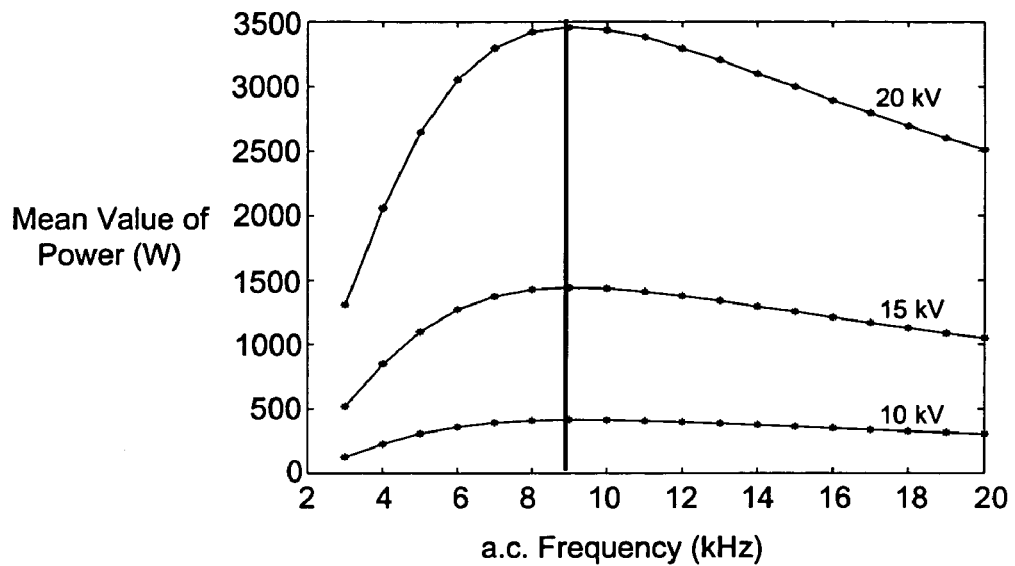
FIGS. 4a and 4b are schematic depictions of frequency and amplitude optimization, respectively, of the plasma actuator.
Figure 4B:
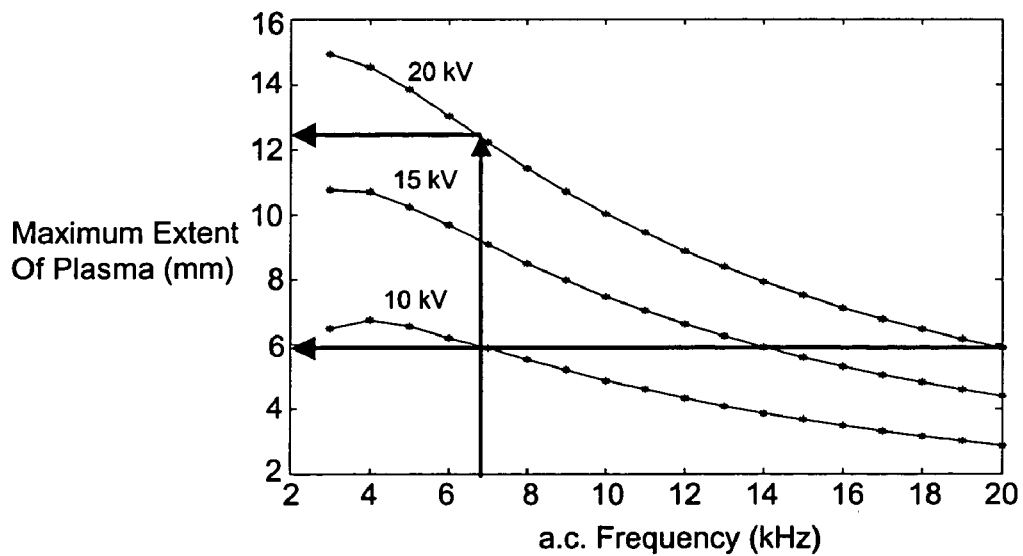

The power dissipated by the plasma actuator 1 and the maximum extent of the plasma discharge as a function of the frequency of the applied AC voltage are shown in FIGS. 4a and 4b, respectively. As modeled by the circuit of FIG. 3, FIGS. 4a and 4b indicate that an optimum frequency exists for peak plasma power. The existence of the optimum frequency allows the width of the covered, insulated electrode 7 to be reduced. For example, as shown in FIGS. 4a and 4b, a width of 12 mm is required for a 20 kV voltage applied at 6 kHz. However, for the same 20 kV voltage, the same plasma power discharge may be obtained if the voltage is applied to a 6 mm electrode at 20 kHz. This allows the width of the covered, insulated electrode 7 to be reduced 50%, i.e. from 12 mm to 6 mm. Reducing the width of the covered, insulated electrode 7 allows more dense packing of actuators to the surface 3 in an array. Using plasma actuators in an array provides a linear additive effect. However, the size of each plasma actuator is directly related to the volume of the plasma it produces. The chordwise length of the plasma actuator cannot exceed the maximum extent of the plasma for actuators used in an array to prevent the overlapping effects.

Figure 5A:
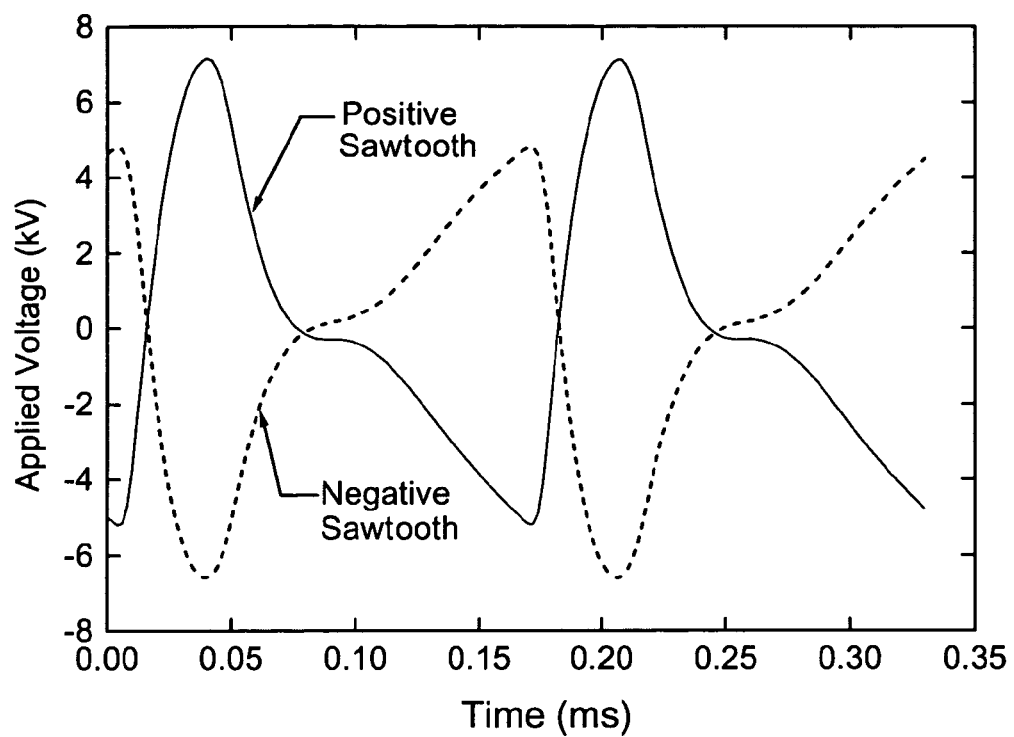
FIG. 5a is an illustration of positive and negative sawtooth voltage waveforms applied to the plasma actuator.
Figure 5B:
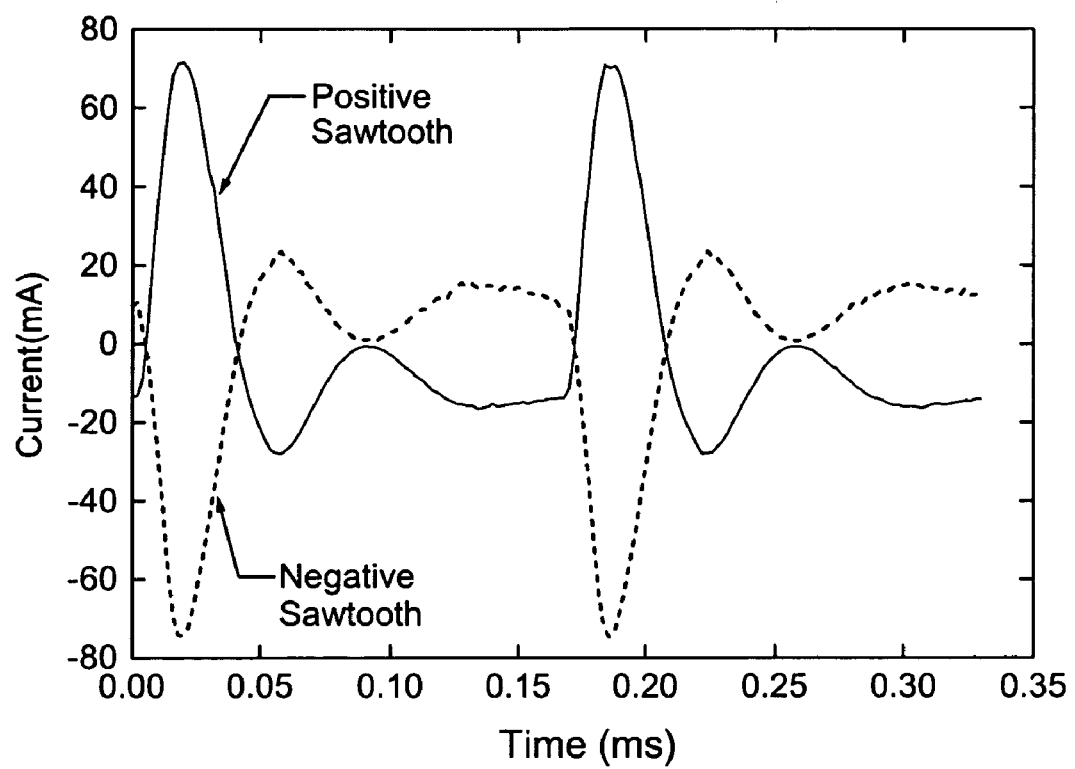
FIG. 5b is an illustration of positive and negative sawtooth current waveforms, corresponding to the positive and negative sawtooth voltage waveforms of FIG. 5a, applied to the plasma actuator.

As discussed above, the spatial structure of the plasma discharge is asymmetric. To determine the effects of this asymmetry, two different asymmetric voltage waveforms, which are mirror images of each other, were applied to the plasma actuator 1. In one case, a positive sawtooth waveform was applied to the plasma actuator 1. In another case, a negative sawtooth waveform was applied to the plasma actuator 1. The positive and negative sawtooth voltage and current waveforms are shown in FIGS. 5a and 5b, respectively.

Figure 5C:
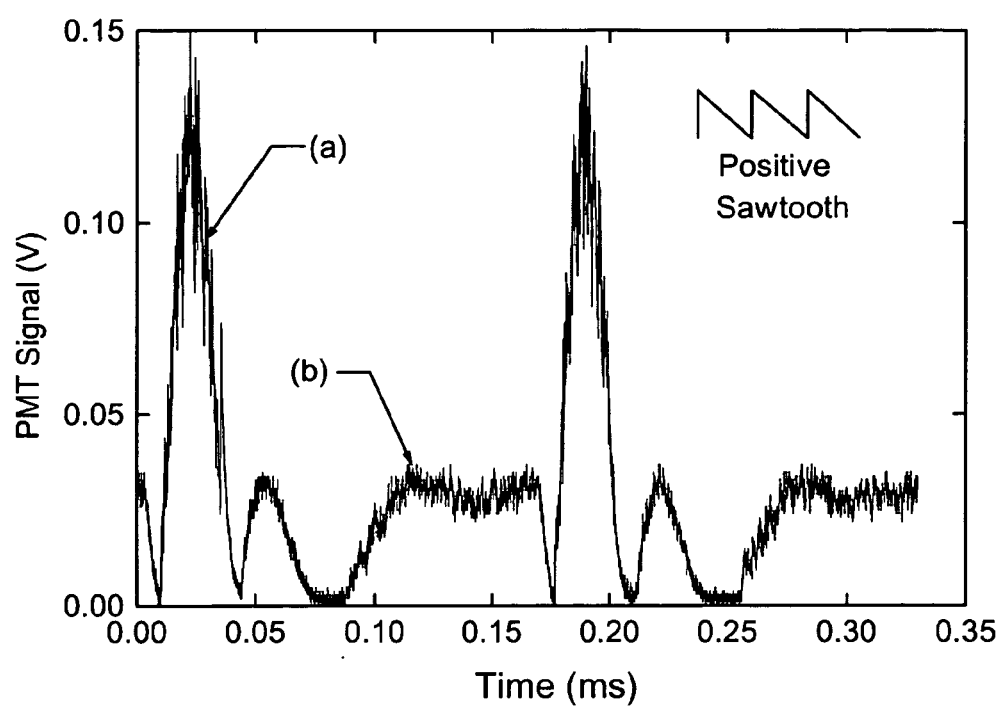
FIG. 5c is an illustration of the light emission from the plasma actuator for the case of the applied positive sawtooth voltage waveform.
Figure 5D:
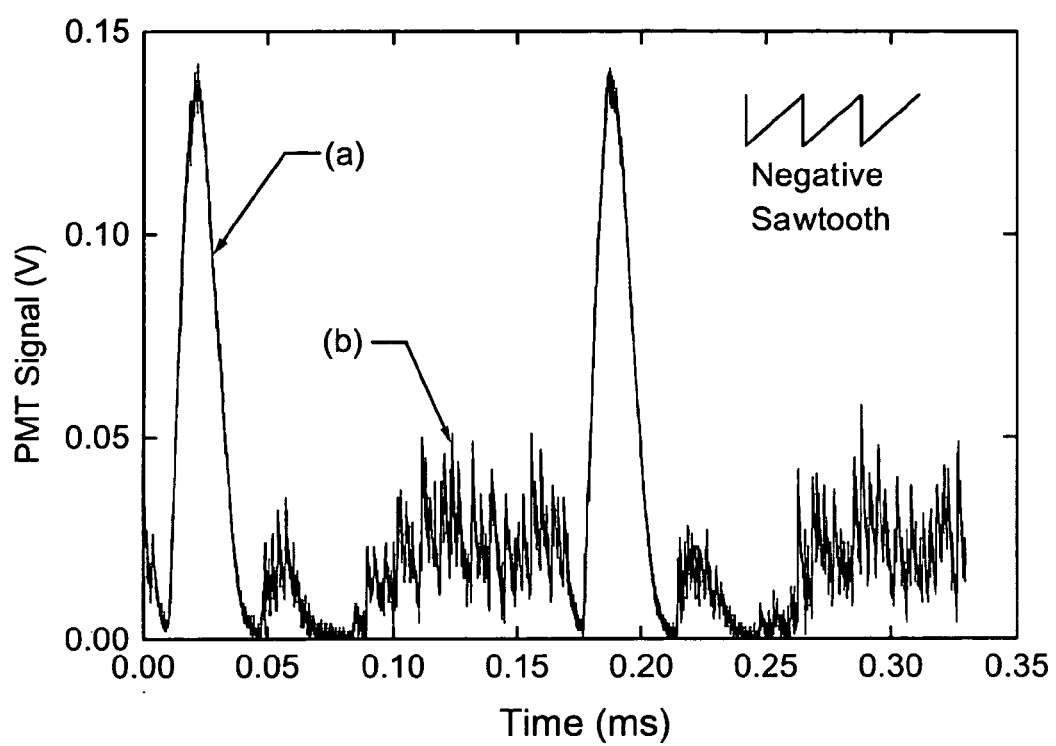
FIG. 5d is an illustration of the light emission from the plasma actuator for the case of the applied negative sawtooth voltage waveform.

FIGS. 5c and 5d illustrate the light emission from the plasma in the case of the positive sawtooth waveform and the negative sawtooth waveform, respectively. Although the light emissions would appear to have generally the same shape, it is clear from the figures that the negative going portion of the waveform, as shown by point (b) in FIG. 5c and by point (a) in FIG. 5d, produces the more uniform discharge. This is consistent with the asymmetry of the plasma discharge discussed above. The positive-going portions of the waveform, as shown by point (a) in FIG. 5c and by point (b) in FIG. 5d, produces an irregular discharge, as discussed above with respect to FIG. 2d.

Figure 5E:
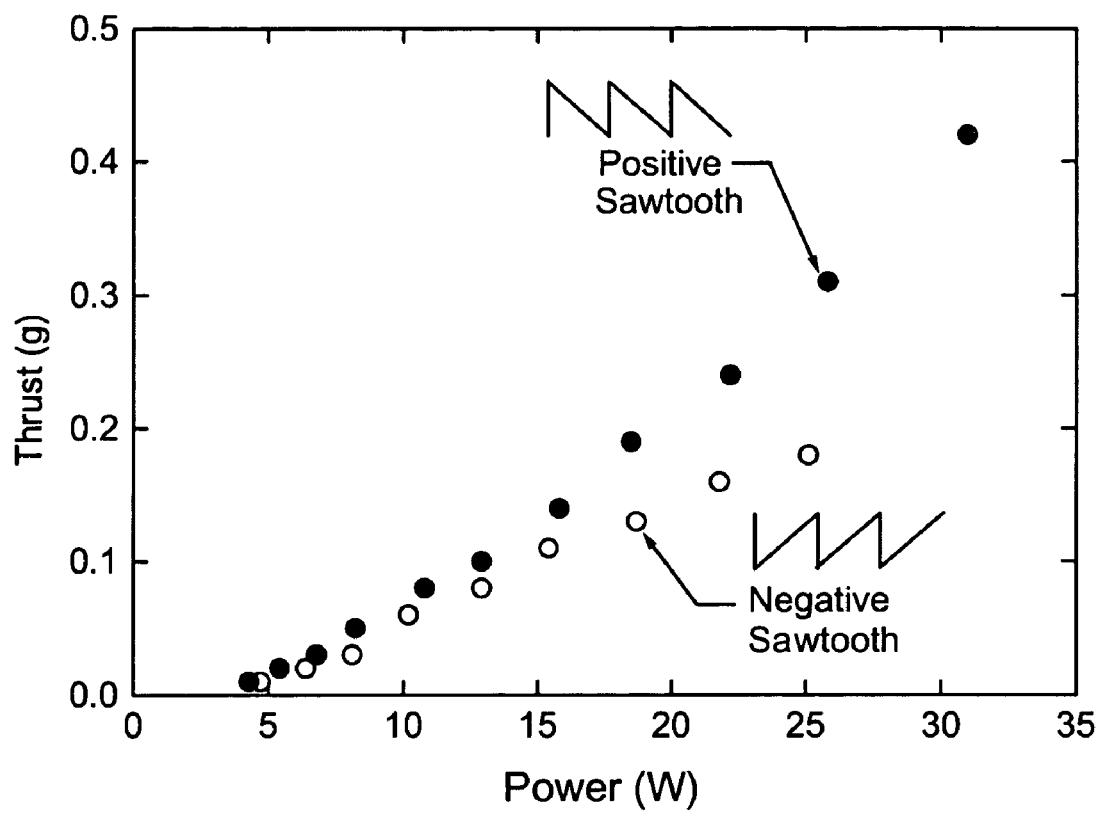
FIG. 5e is an illustration of thrust versus dissipated power of the plasma actuator for both the positive and negative sawtooth applied waveforms.

The plasma actuator's effectiveness may be determined by measuring the thrust it produces in initially still air. To measure the thrust, the actuator is mounted on a lever arm and the thrust it produces is measured on a mass balance at the opposite end of the lever arm. FIG. 5e shows thrust versus dissipated power for the positive and negative sawtooth waveforms. As shown in the figure, the positive sawtooth waveform, which has a higher negative-going duty cycle and produces a more diffuse plasma for a greater fraction of the discharge cycle, produces a greater thrust than the negative sawtooth waveform. The negative sawtooth waveform produces a more irregular plasma for a greater fraction of the discharge cycle and is less efficient in coupling momentum into the airflow for a comparable dissipated power. This result disproves the theory that the operation of a plasma actuator may be primarily attributable to the bulk heating of the air.

Figure 5F:
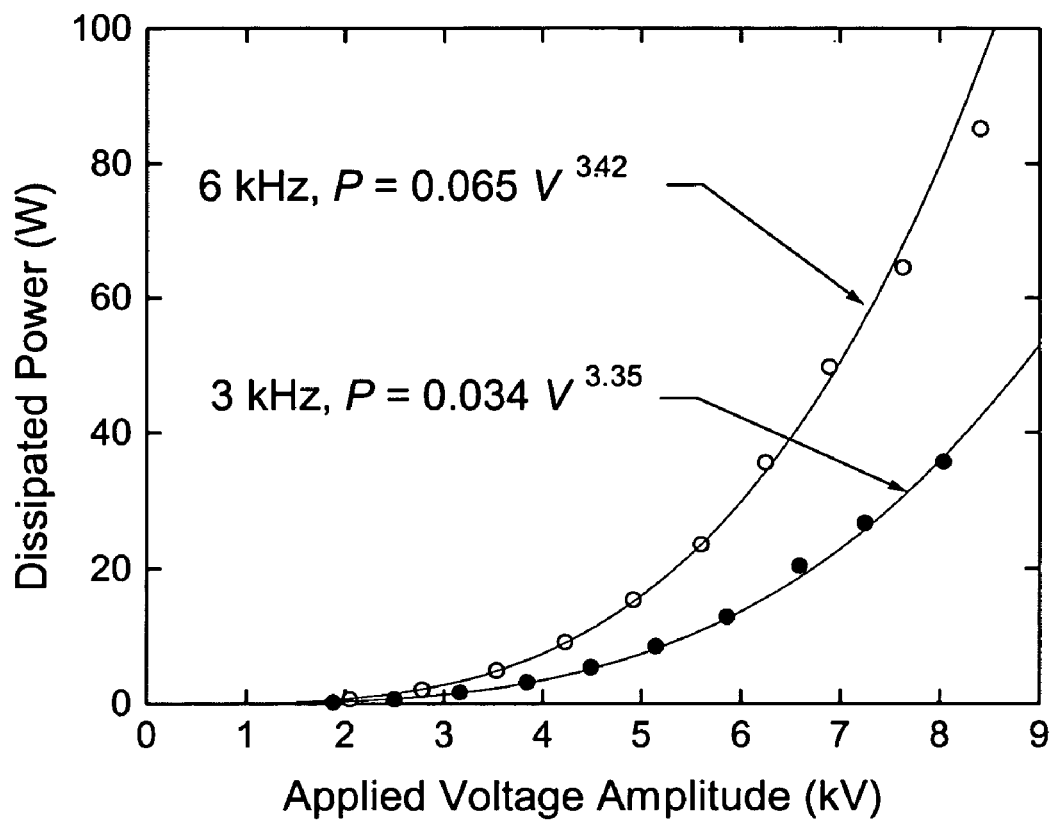
FIG. 5f is an illustration of power dissipated in the plasma.

Referring again to FIG. 3, the power dissipation as a function of the amplitude of the applied voltage is consistent with the form and structure of the plasma and its discharge as discussed above. When the plasma ignites, effectively shorting out the capacitor C1, it forms part of a voltage divider. The impedance Z2 of the other element of the voltage divider, i.e. the capacitor C2, depends on the frequency of the applied waveform, $Z2=-i/\omega C2$. For a fixed frequency, the power dissipated would go as $V_{AC}^2$, if C2 is constant, wherein $V_{AC}$ is the applied voltage. Referring to FIG. 5f, the power dissipated in the plasma goes approximately as $V_{AC}^{7/2}$.

The results shown in FIG. 5f are consistent with one or both of two situations: 1) the average capacitance of the capacitor C2 increases with increasing applied voltage; and/or 2) the average resistance of the resistor R1 decreases with increasing applied voltage. As discussed above with respect to FIG. 2h, the higher the applied voltage, the faster the plasma discharge spreads along the surface of the dielectric 7. Therefore, the average area of the virtual electrode 13 increases with increasing applied voltage with a corresponding increase of the capacitance of the capacitor C2 in the model shown in FIG. 3.

Figure 5G:
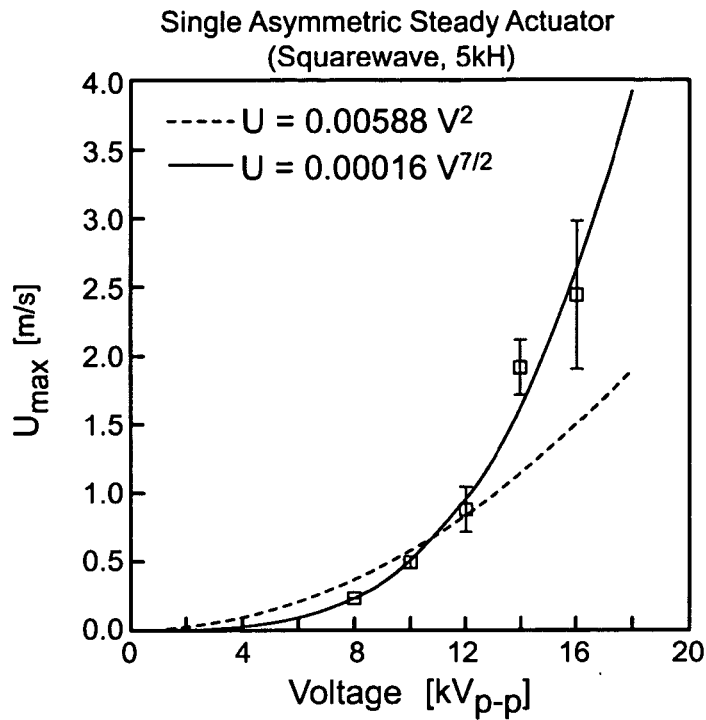
FIGS. 5g and 5h illustrate the induced velocity of air versus applied voltage for a square waveform and a triangle waveform, respectively.
Figure 5H:
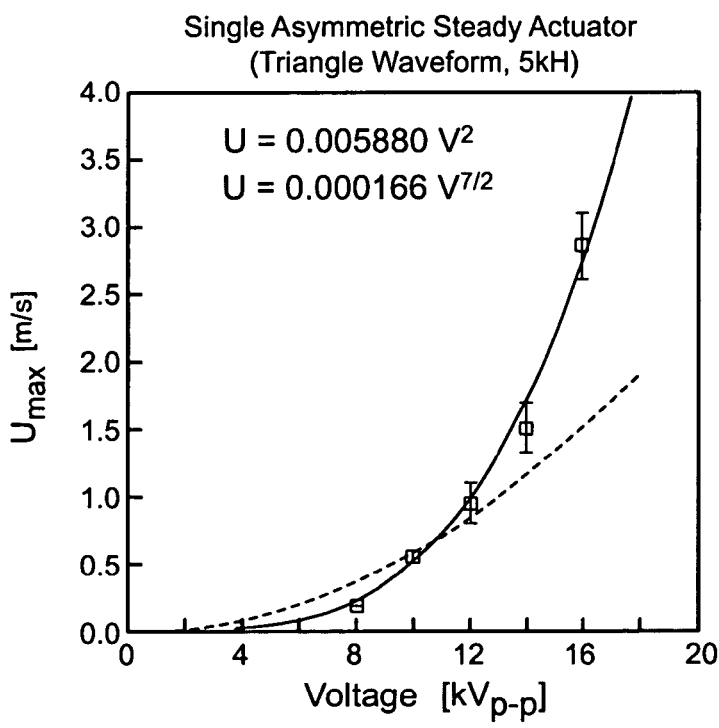

Referring to FIGS. 5g and 5h, particle image velocimetry (PIV) measurements of the velocity induced in the air by the plasma actuator 1 shows that that velocity imparted to the flow also goes approximately as $V_{AC}^{7/2}$. This result indicates a direct proportionality between the electrical power dissipated in the actuator and the velocity induced in the air The efficiency of the momentum coupling may be controlled by interactions at the edge of the exposed electrode 5. FIG. 5g shows the induced velocity for a square waveform applied voltage and FIG. 5h shows the induced velocity for a triangle waveform applied voltage. The results shown in FIGS. 5g and 5h indicate that the proportionality of the induced voltage to $V_{AC}^{7/2}$ applies irrespective of waveform shape.

Figure 5I:
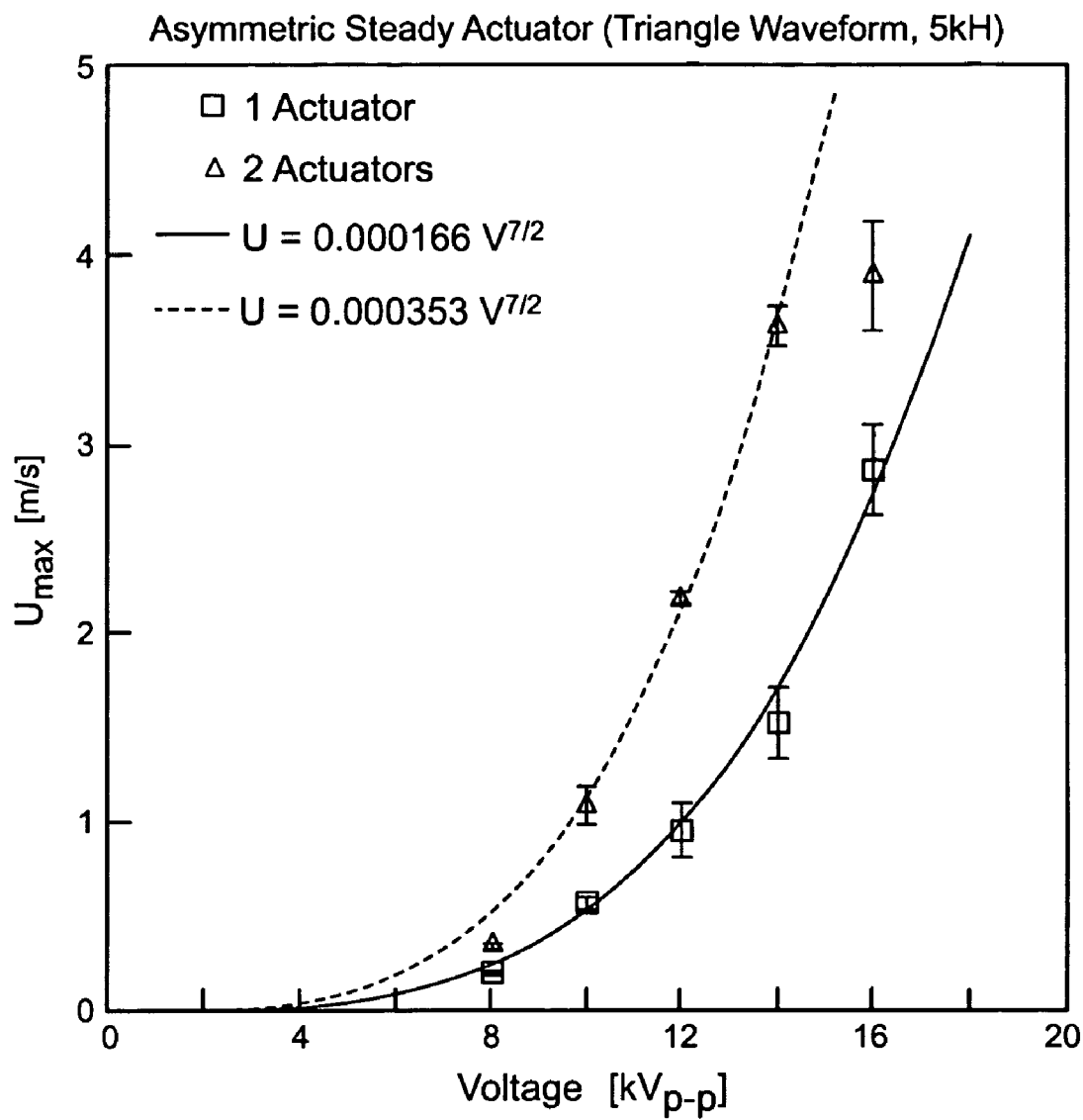
FIG. 5i illustrates the linear additive effect of plasma actuators.

As discussed above, the use of multiple actuators provides a linear additive effect, i.e. the velocity increase of multiple actuators is additive. Referring to FIG. 5i, for an applied voltage, two actuators placed one behind the other provides more than twice the velocity increase of a single actuator alone.

Figure 5J:
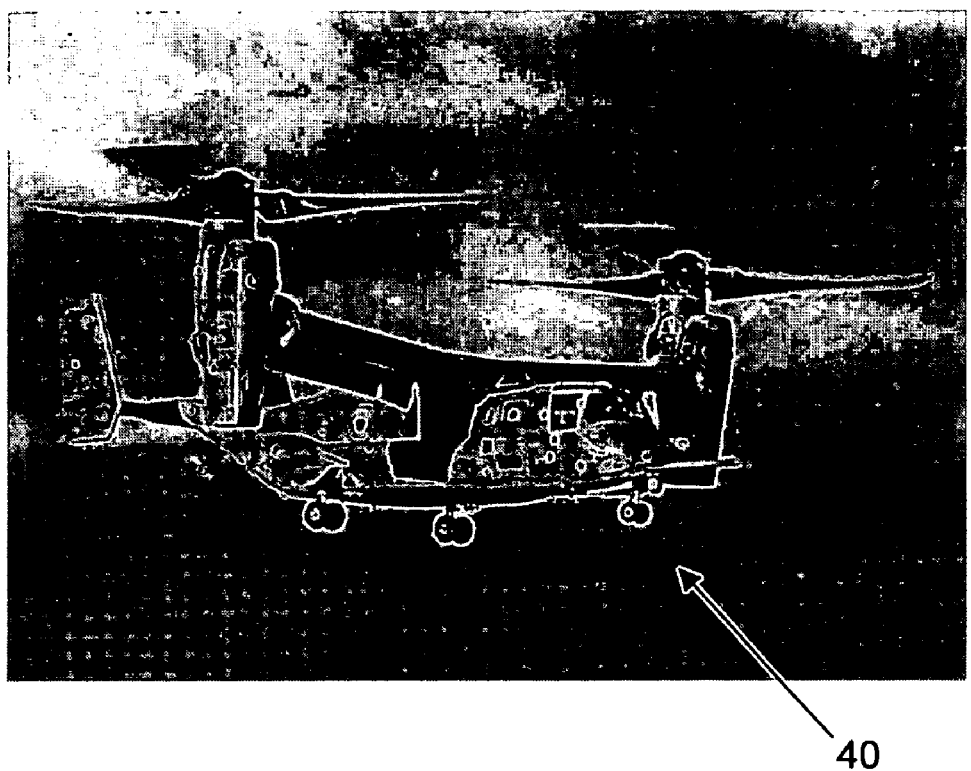
FIG. 5j illustrates an aircraft usable with plasma actuators according to the present invention.
Figure 5M:
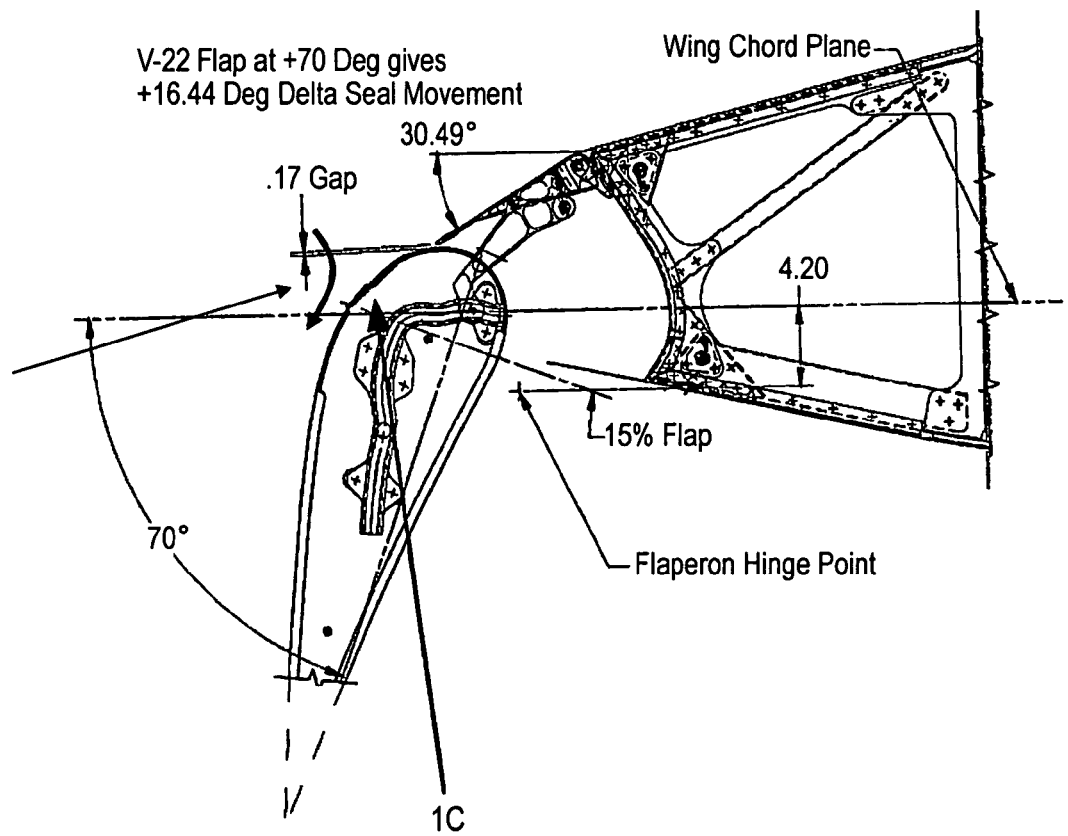

Plasma actuators according to the present invention may be used on VTOL aircraft, including tilt rotor aircraft 40 as shown in FIG. 5j. As shown in FIGS. 5k and 5l, the tilt rotor aircraft 40 includes an airfoil 42. The airfoil 42 includes a first section 44 and a second section 46 that is pivotable relative to the first section 44. The second section 46 may be referred to as a flap. As shown in FIG. 5m, a hinge flap cover 48 is provided between the first section 44 and the second section 48. A leading edge (LE) plasma actuator 1B is provided on the first section 44 at a position x/c=0. A trailing edge (TE) plasma actuator 1C is provided on the second section 46 at a position that is spaced from a leading edge of the trailing section, for example at a position x/c=0.17. During vertical take off of the tilt rotor aircraft 40, the section 46 is pivoted as shown in FIG. 5m.

The plasma actuator 1 may be used to provide lift augmentation on wings through separation control on leading and trailing edges of wings of VTOL aircraft in hover and forward flight. This affects various performance aspects of an aircraft. These aspects include payload, range, endurance, and maximum and sustained turn rates. In a two dimensional wing, the maximum achievable lift is ultimately limited by the ability of the airflow to follow the curvature of the airfoil. When the airflow cannot follow the curvature, the airflow separates. The separation may occur at the leading edge, near the trailing edge in flap configurations, or other locations on the airfoil based on flight conditions.

Figure 6A:
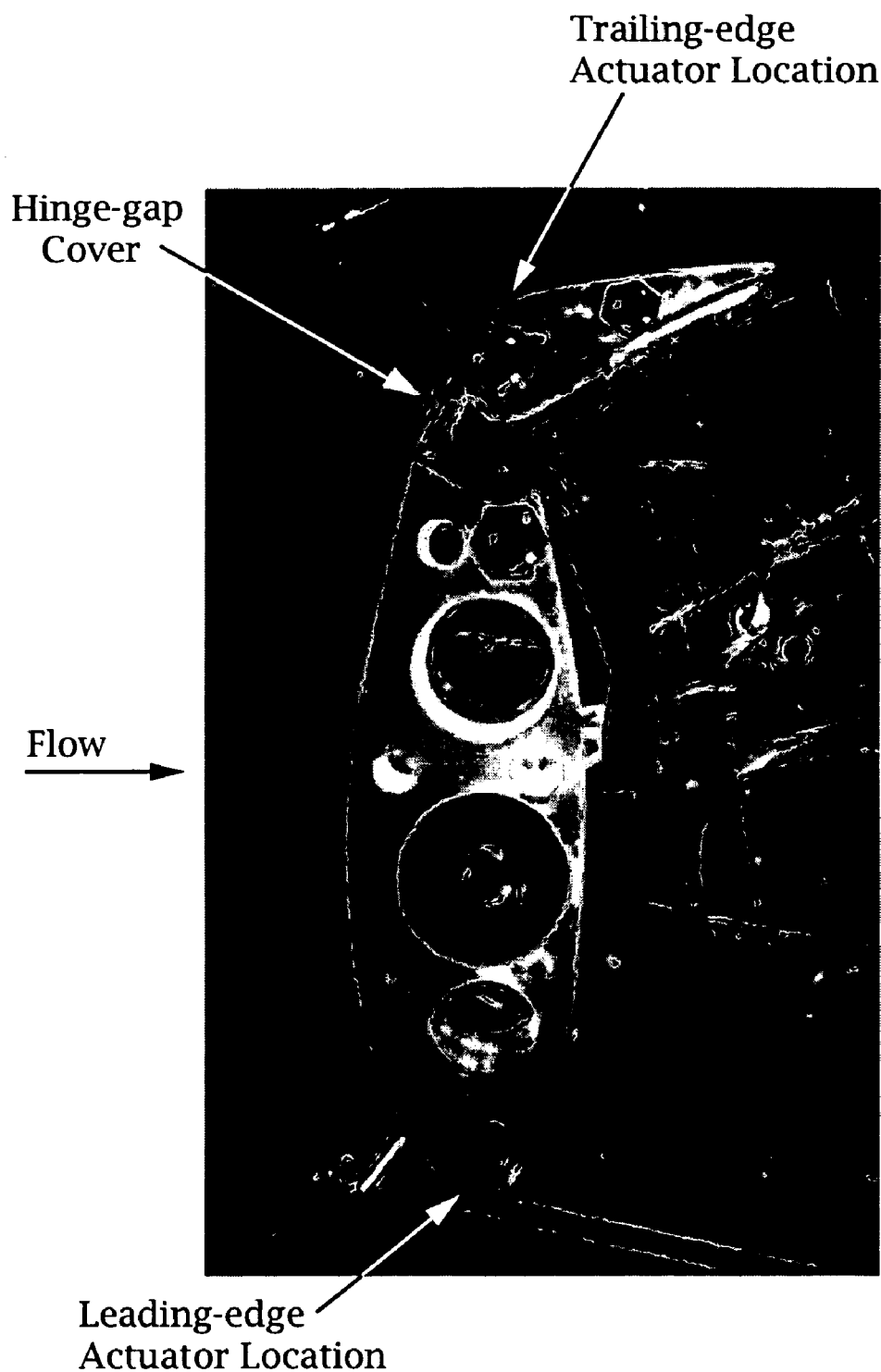
FIGS. 6a and 6b are photographs of plasma actuators on the leading and trailing edges of an airfoil.
Figure 6B:
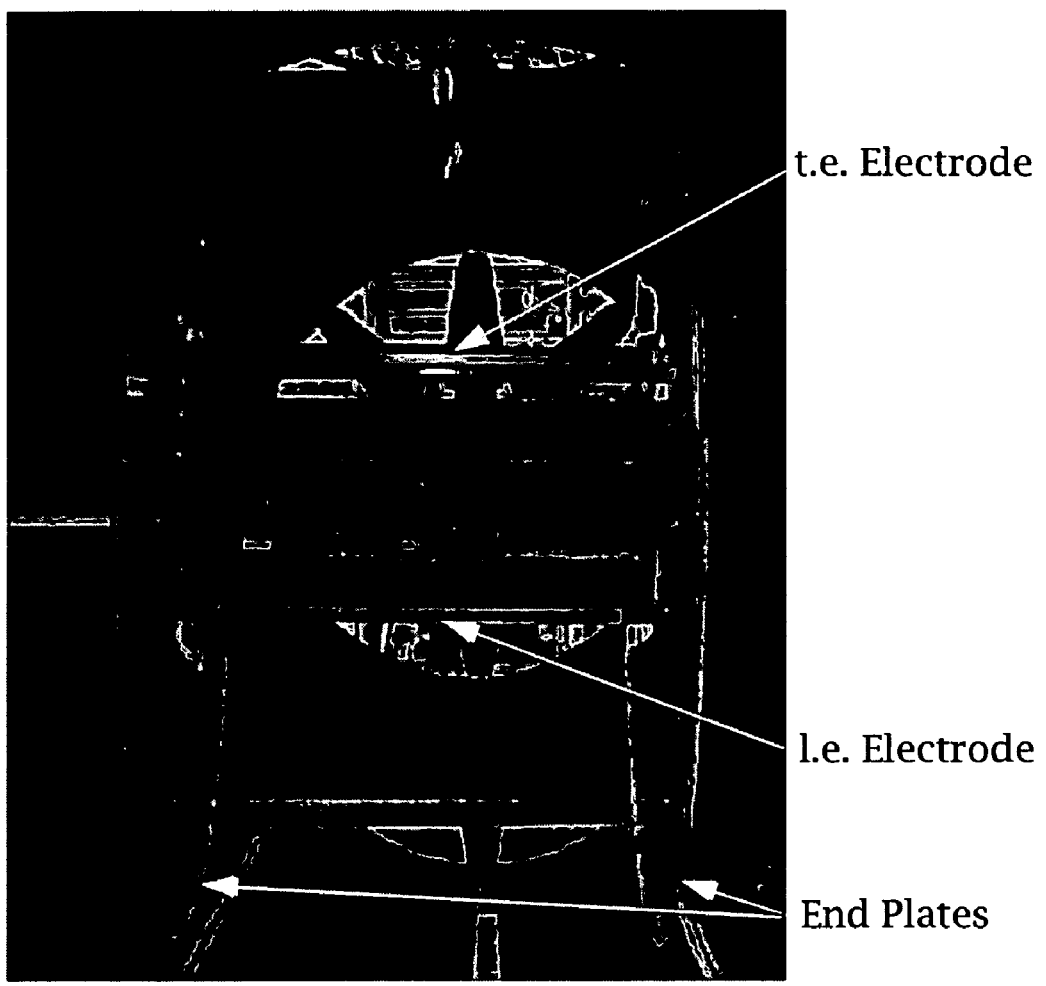
Figure 6C:
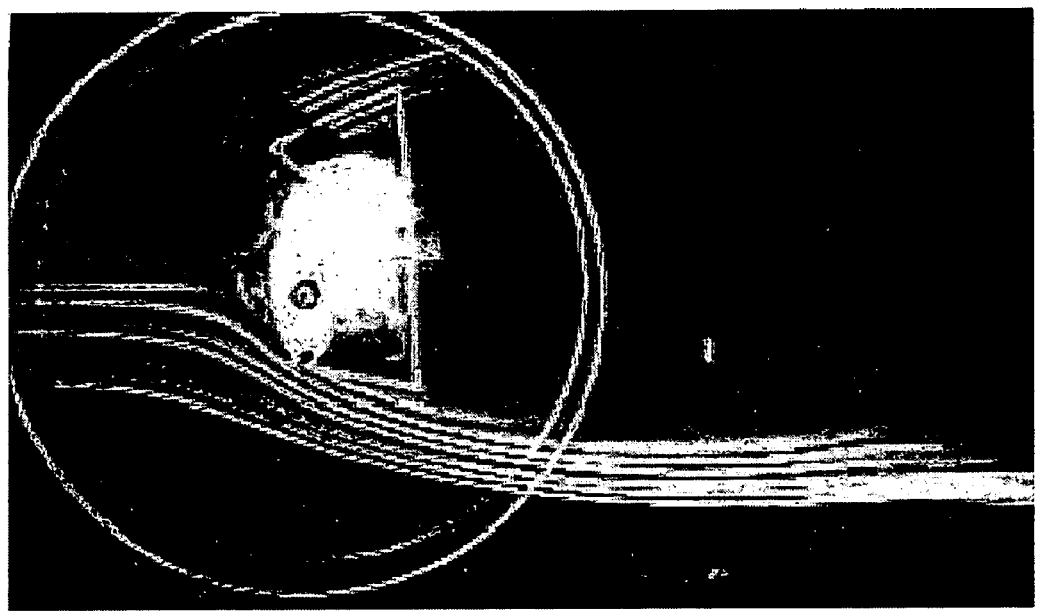
FIGS. 6c and 6d are flow visualizations with the leading and trailing edge plasma actuators off and on, respectively.
Figure 6D:
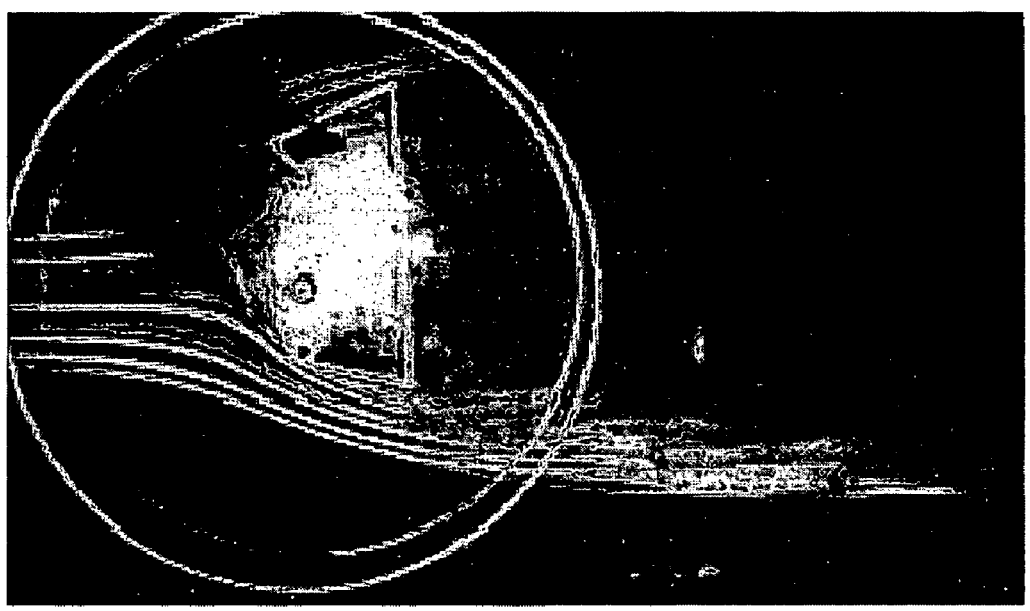

Referring to FIGS. 6a and 6b, the plasma actuator may be placed on the leading and trailing edges of an airfoil to control flow separation. The plasma actuator may be bonded, adhered, or laminated to the surface of the airfoil. The plasma actuator may also be recessed in the airfoil so that the exposed electrode is flush with the aerodynamic surface of the wing airfoil. As shown in FIG. 6b, the exposed electrode and the covered electrode are aligned in the spanwise direction. The electrodes are positioned so that the junction between the electrodes are slightly upstream of the chord location(s)

where the flow separates. In the hover configuration for the V-22 wing, these were at the leading edge, x/c=0, and on the flat at $x_F/c_F$=0.17. The arrangement of the plasma actuators induces a velocity component in the downstream direction to inhibit flow separation over the wing and into the wake.

In the plasma actuator shown in FIGS. 6a and 6b, the two electrodes are formed of 0.05 mm thick copper foil tape. The dielectric is formed of KAPTON® film having a thickness of 0.025 to 0.127 mm with dielectric constant of approximately 3.3 and a breakdown voltage of approximately 6 kV per $10^{-3}$ inch thickness. The applied a.c. voltage may be 7 to 12 $kV_{p-p}$ and the frequency may be approximately 3 to 10 kHz. The airfoil profile was that used on a V-22 aircraft with a 15.24 cm chord and a 22.86 cm span.

The airfoil was tested in a subsonic wind tunnel at the Center for Flow Physics and Control (FlowPAC) in the Hessert Laboratory at the University of Notre Dame. Smoke was introduced into the airflow to provide visualization of the airflow. Referring to FIG. 6b, the airfoil was supported by endplates made of plexiglass to allow visual access to the airflow. The endplates also minimized three dimensional end effects on the airfoil. Experiments were conducted in which the airfoil was stationary. In those experiments the endplates were circular with a 20 cm radius. A first pitot static probe located in the airflow provided a reference static pressure for each pressure port. A second pitot static probe was mounted to a traversing mechanism two chord lengths downstream of the airfoil at its spanwise center line. Discrete points were sampled across the wake to determine the mean velocity profile on the surface of the airfoil.

Figure 6E:
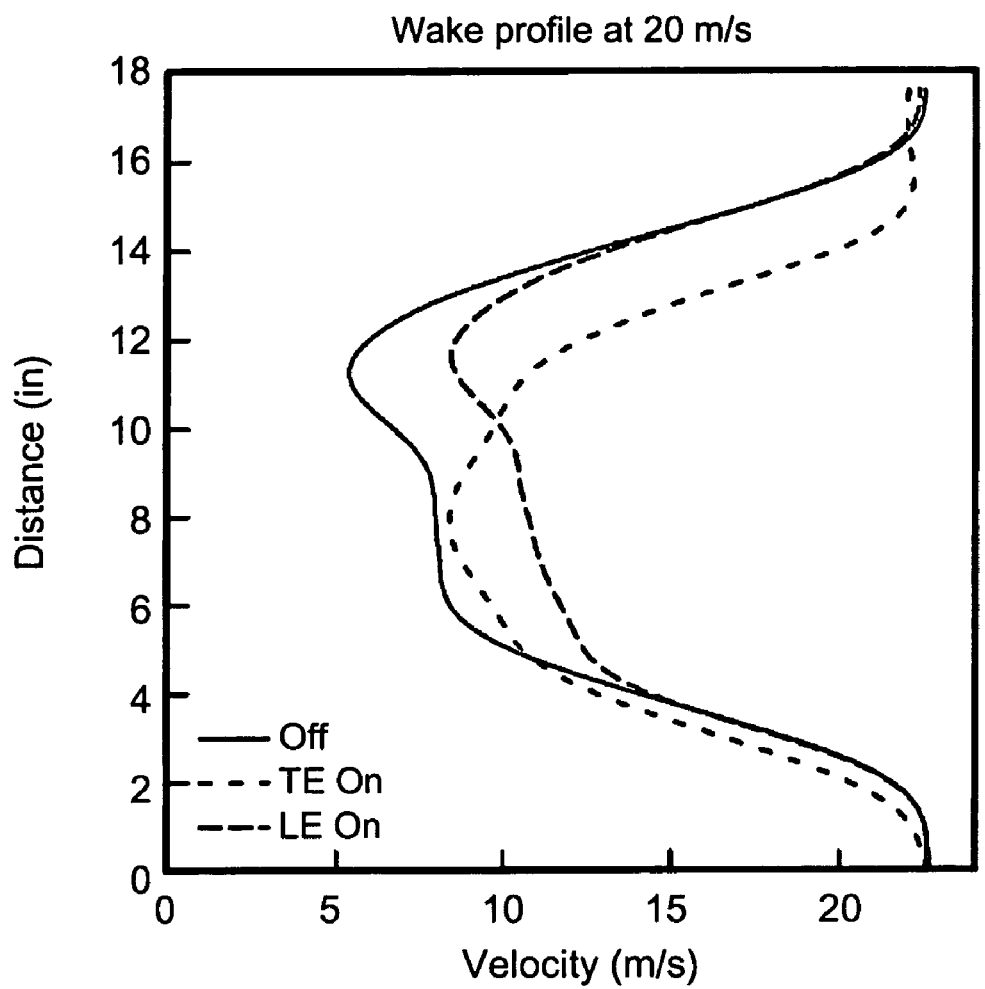
FIGS. 6e and 6f are mean velocity profiles when the leading and trailing edge plasma actuators are operating separately and simultaneously, respectively.
Figure 6F:
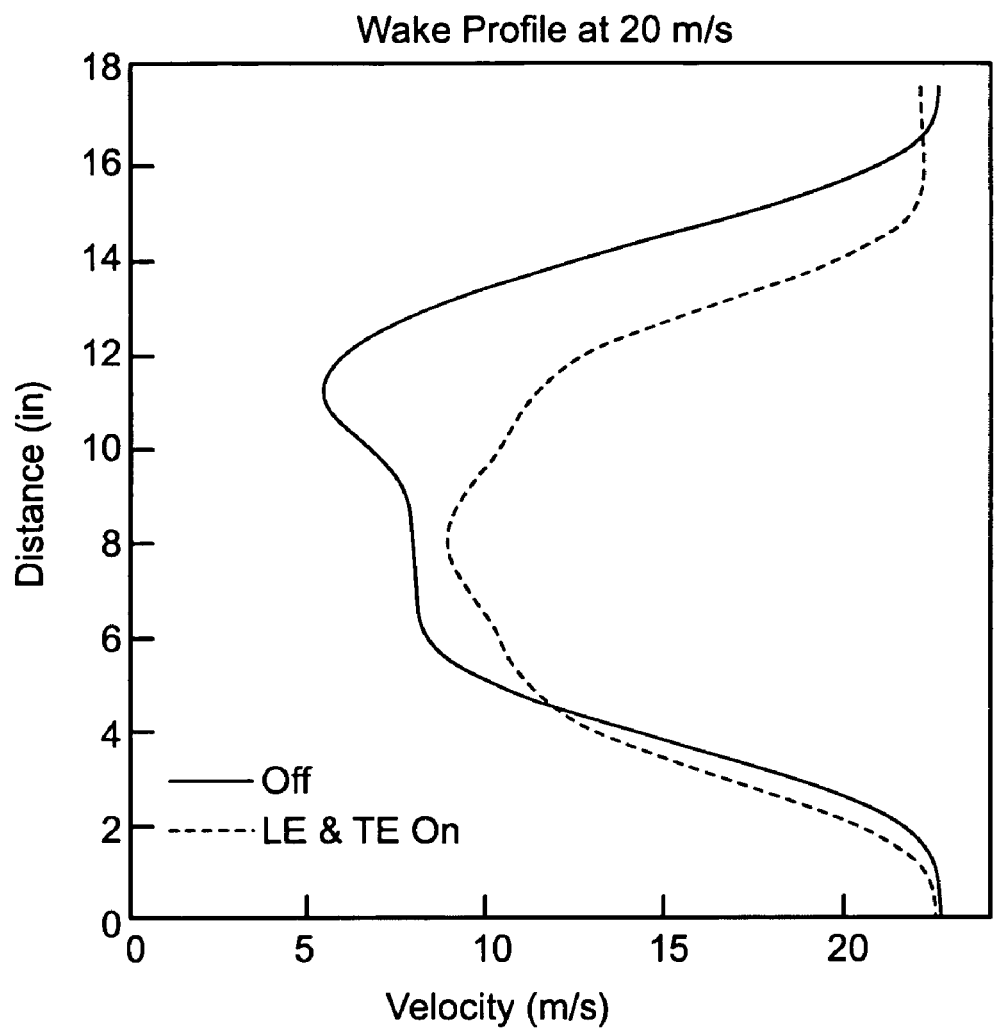

The effectiveness of the plasma actuator in controlling separation of the airflow around the wing in a hover configuration was evaluated on the basis of drag reduction. FIGS. 6e and 6f correspond to mean velocity profiles measured in the wake of the V-22 wing in the hover configuration with a flap angle of 70°. The air velocity $U_\infty$ was 20 m/s. The solid curve in FIG. 6e corresponds to when all of the plasma actuators were off. The other dashed curves in the figure correspond to when the leading edge or flap plasma actuators were operating separately. For each actuator, the effect is to increase the velocity in the wake of the wing which signifies a lowering of the drag. FIG. 6f shows the effect of operating both of the plasma actuators simultaneously. This corresponds to the dashed curve. The combined effect give the maximum amount of drag reduction.

Figure 7A:
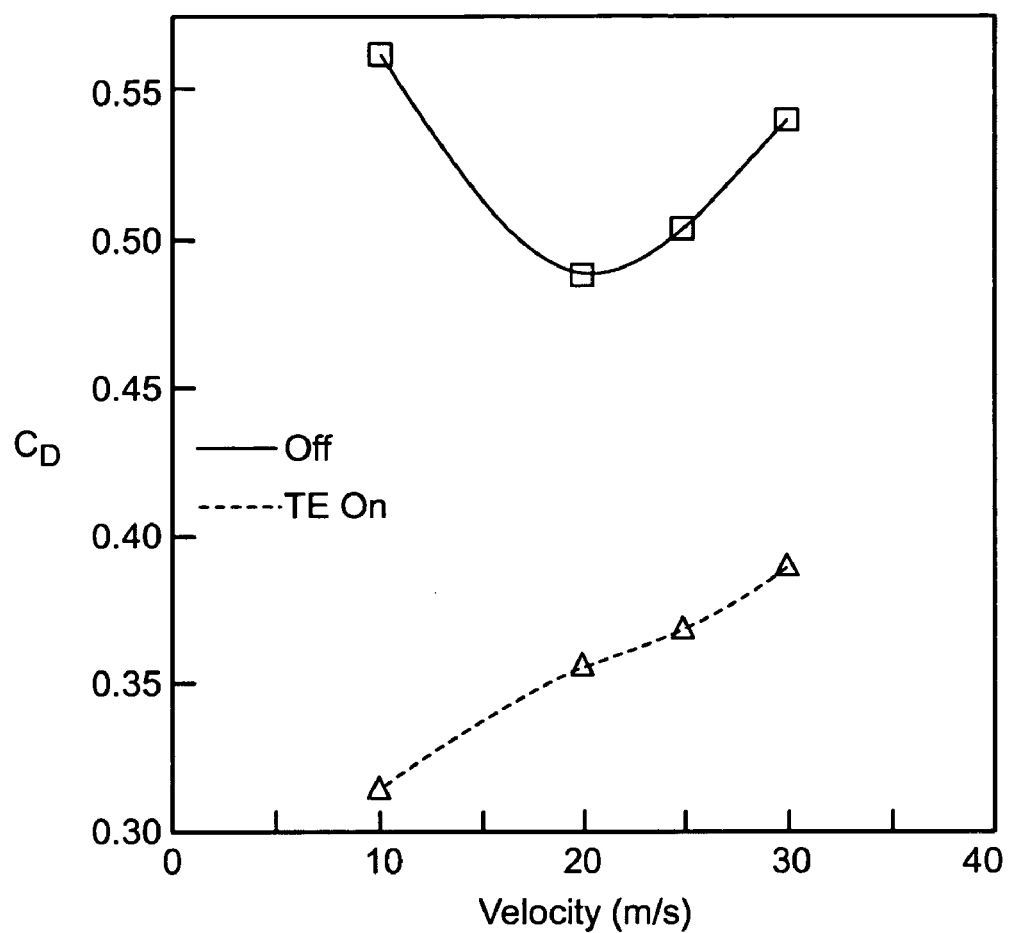
FIG. 7a illustrates the drag coefficient for a range of velocities.

The effect of the plasma actuator on the drag for a range of velocities is compiled in FIG. 7a. This shows the drag coefficient Cd with the actuator off as the solid curve, and the drag coefficient with the flap actuator on as the dashed curve. The plasma actuator produced a significant reduction in the drag which is observed as a downward shift in the curve with the actuator on.

Figure 7B:
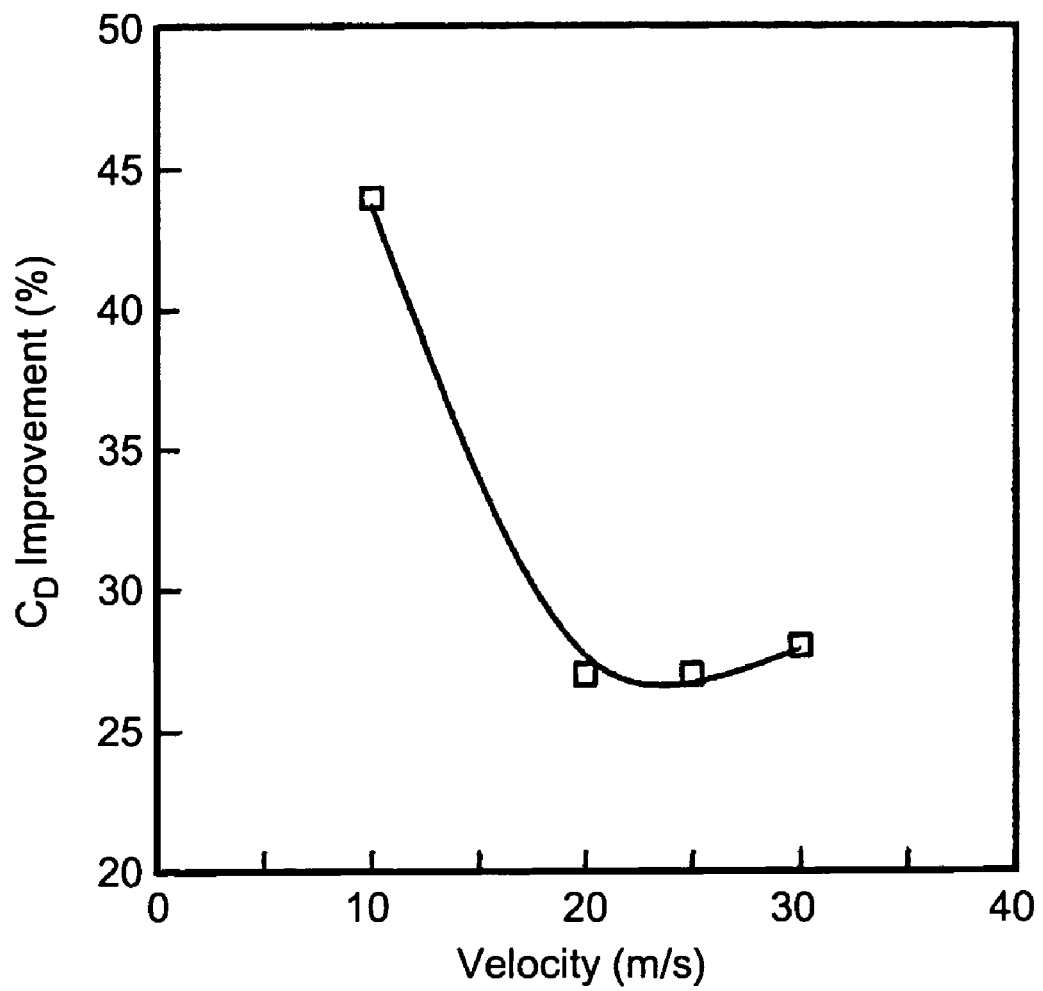
FIG. 7b illustrates the overall lowering of the drag coefficient for a range of velocities.

The overall improvement (lowering) of the drag on the wing is summarized in FIG. 7b. At the lowest speed, the drag is lowered by almost 45%. This large improvement is due to controlling the separation at both the leading edge and flap. At higher speeds, the leading edge flow is nearly attached naturally, and most of the improvement comes from the flap plasma actuator. In these cases the drag is lowered by approximately 25%.

The power used by the plasma actuator is dependent on the mode in which it is operated. The plasma actuator may be operated in "steady" or "unsteady" mode. In "steady" mode, the plasma actuator is operated at the applied a.c. voltage frequency, e.g. 3 to 30 kHz. The frequency of the applied a.c. voltage is greater than the fluid response frequency and the airflow is thus subject to a constant body force $f_B$.

Figure 8:
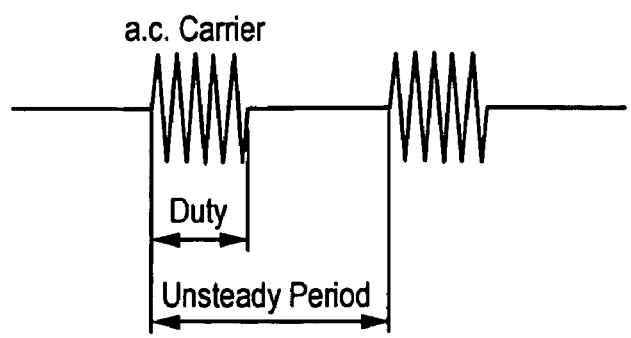
FIG. 8 schematically illustrates a duty cycle for unsteady operation of plasma actuators according the present invention.

There are advantages to operating the plasma actuator in the "unsteady" mode for a stationary airfoil. In the "unsteady" mode, the applied a.c. voltage frequency is switched on and off at lower frequencies, for example down to a fraction of a Hertz. Referring to FIG. 8a, for unsteady operation, the a.c. voltage is cycled off and on with an unsteady period (i.e. the forcing frequency f=1/(2πT), where T is the unsteady period). The percentage of time (duty) within the period that the a.c. voltage is on is controllable.

It has been found that the introduction of periodic disturbances near the separation location can cause the generation of coherent vortical structures that can prevent or delay the onset of separation. The vortical structures may intermittently bring high momentum fluid to the surface and enable the airflow to withstand the adverse pressure gradient without separating. The unsteady operation may be used to excite vortical structures and fluid instabilities that act to amplify the effect of the plasma actuator 1. The forcing frequency that provides the most desirable result has been found to occur when the Strouhal number, $St=fc/U_\infty$, is approximately unity, where f is the plasma actuator forcing frequency, c is the length of the separated region and $U_\infty$ is the airflow velocity. In the unsteady operation, very short duty cycles are possible which lowers the power requirement of the plasma actuator. For example, a 10% duty cycle reduces the power requirement by 90%.

For example, the results in FIGS. 6e, 6f, 7a, and 7b were obtained with an "unsteady" mode of operation with a 10% duty cycle. The optimum conditions correspond in these cases to Strouhal numbers between 1.0 and 1.3, with the length of the separated region corresponding to the chord length without the flap. The total power used was approximately 2 watts.

Figure 9A:
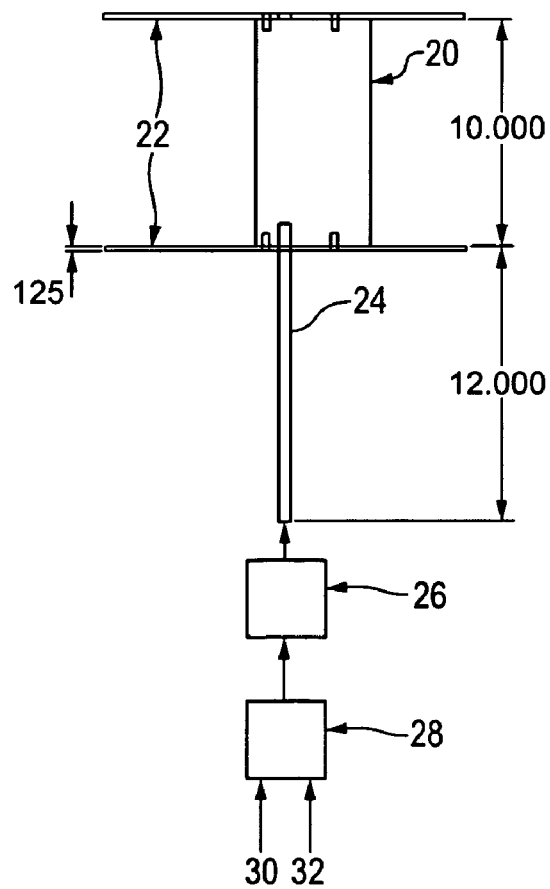
FIG. 9a depicts a side view of an airfoil test device configuration according to the present invention.

Referring to FIG. 9a, experiments were also conducted in which the airfoil 20 was oscillated, i.e. the angle of attack a was varied. In those experiments, the endplates 22 were round with a 20 cm radius. A rotating shaft 24 was attached to the center of the endplates 22 at the airfoil's pitch location, which corresponds to the quarter-chord location, i.e. x/c=0.25. A servomotor 26 was used to oscillate the shaft. A controller 28 was built into the servomotor 26, although it should be appreciated that the controller 28 could be provided separately from the servomotor 26. Two encoder signals 30, 32 were used to determine the instantaneous angle of attack a during the oscillating cycle of the airfoil 20.

Figure 9B:
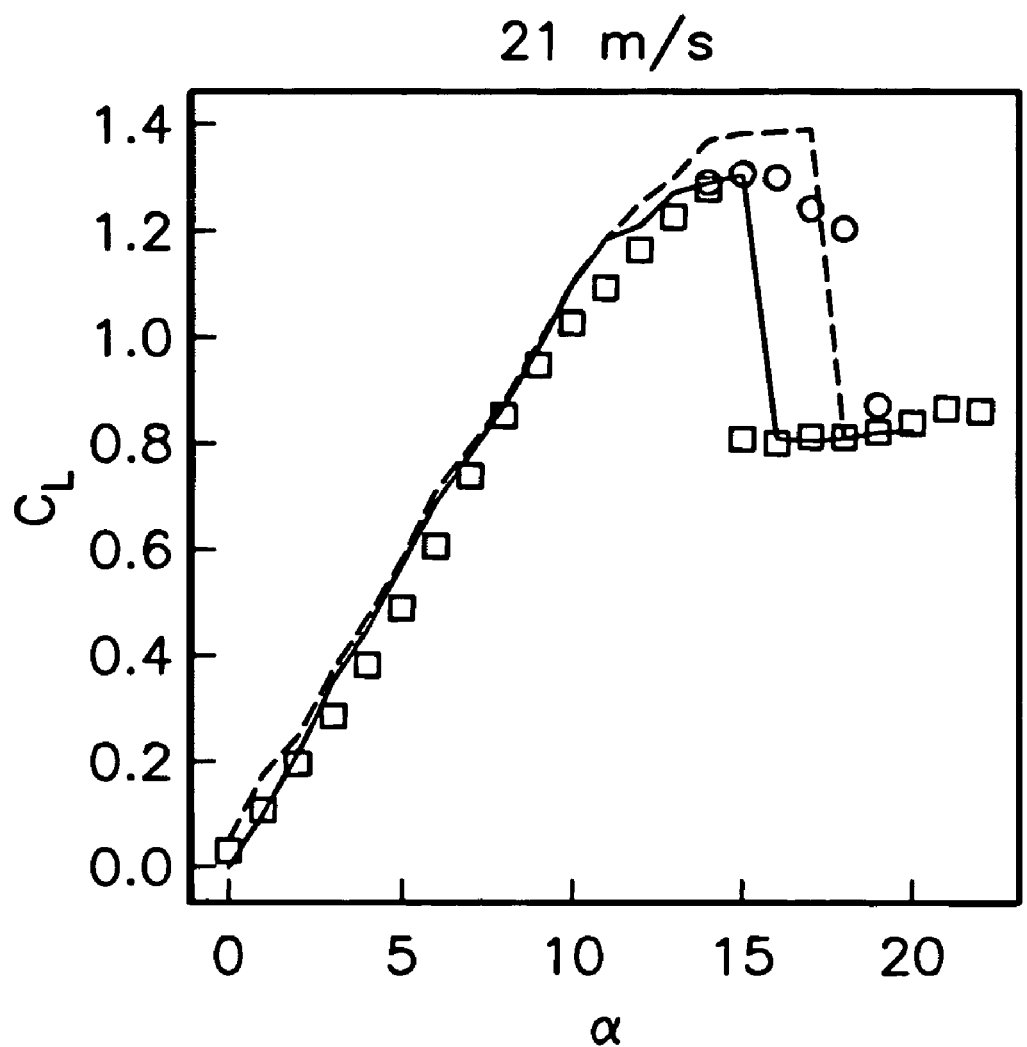
FIGS. 9b illustrates the lift coefficient versus the angle of attack for an airfoil provided with a plasma actuator according to the present invention with the plasma actuator on and with the plasma actuator off.

Referring to FIG. 9b, the lift coefficient $C_L$ versus angle of attack α for steady operation is illustrated. With the plasma actuator off, shown by the square symbols, the lift increases linearly up to the natural static stall angle of approximately 14°. The solid curve represents the numerical prediction of the case where the plasma actuator is off. When the plasma actuator is on in the steady mode, shown by the circle symbols, the stall angle increases to approximately 18°. This is in agreement with the numerical simulation that involves computing the body force distribution for the electrode arrangement and adding the computed body force distribution to the momentum equation.

Figure 9C:
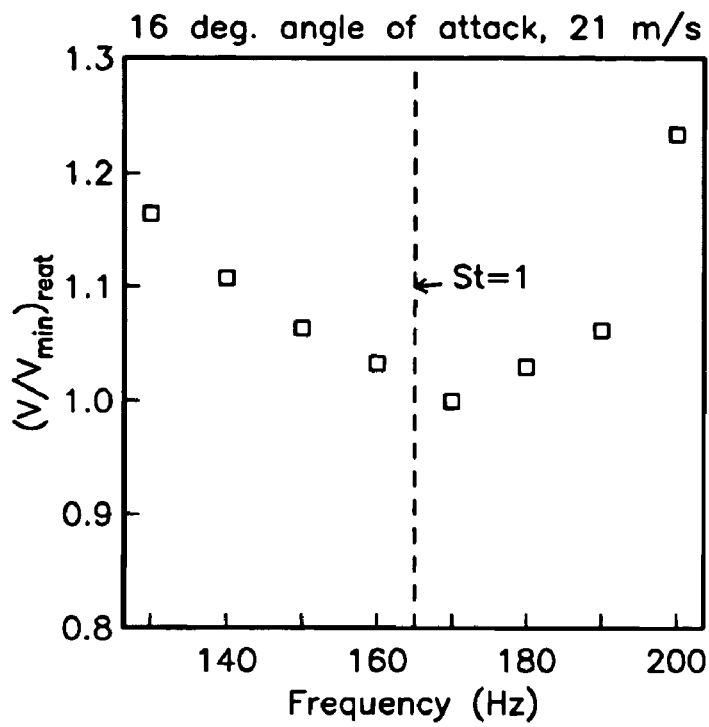
FIG. 9c illustrates the minimum voltage required to reattach the airflow as a function of the frequency of the applied a.c. voltage for unsteady operation.
Figure 9D:
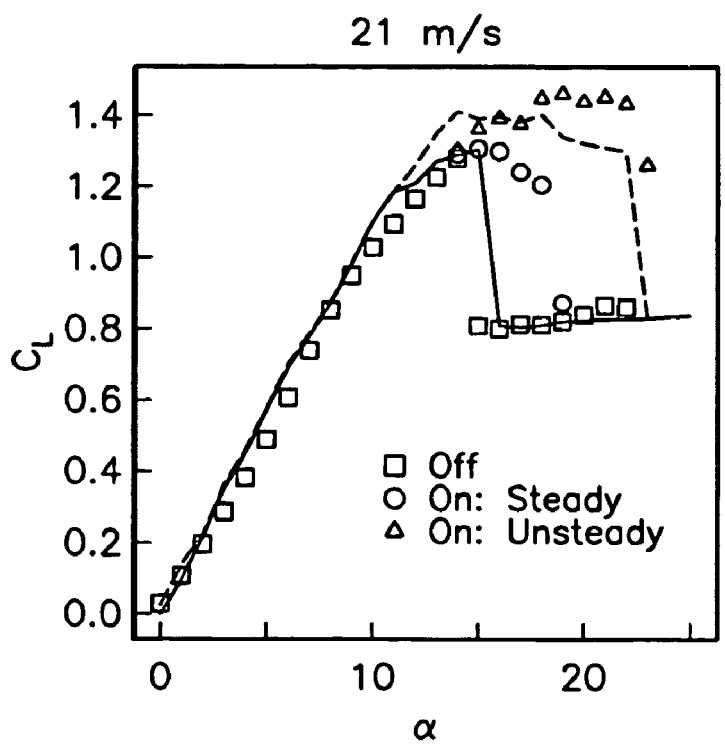
FIG. 9d illustrates the lift coefficient versus the angle of attack for an airfoil provided with a plasma actuator according to the present invention with the plasma actuator on in unsteady mode and steady mode and with the plasma actuator off.

Referring to FIG. 9c, the minimum voltage to reattach the flow as a function of applied a.c. voltage for the unsteady operation is illustrated. FIG. 9d illustrates the lift coefficient versus angle of attack with the plasma actuator on and off for a Strouhal number of approximately unity. These figures show that when the plasma actuator is operated in the unsteady mode with periodic forcing at St≈1, the lift coefficient was increased and lift was maintained to an angle of attack α=22°, which is 8° past the natural static stall angle. The results obtained in FIGS. 9b-d were obtained with a 10% duty cycle.

Referring again to FIG. 9a, the airfoil 20 was mounted on the rotatable shaft 24 to allow for variation of the angle of attack α of the airfoil 20. Oscillating the airfoil 20 to vary the angle of attack α is useful for the study of retreating blade stall on helicopter rotors. As discussed below, the airfoil was oscillated in a periodic cycle about its quarter chord location so that the angle of attack $\alpha=\alpha_{mean}+\alpha_{max}\sin\omega t$, where $\omega=2kU_\infty/c$ and ω is the physical pitch oscillating frequency, c is the cord length, k is the reduced/normalized frequency and $U_\infty$ is the airflow velocity. Under these conditions, a dynamic stall occurs when the airfoil is pitched above its natural static stall angle. The lift initially increases as the airfoil pitches up and continues to increase past the static stall angle. During this process, a vortex initially forms at the leading edge of the airfoil and is eventually shed and convects downstream over the airfoil, returning some lift. After the vortex passes the trailing edge of the airfoil, the flow fully separates. As the airfoil continues to pitch down, the airflow eventually reattaches and the cycle repeats.

Figure 9E:
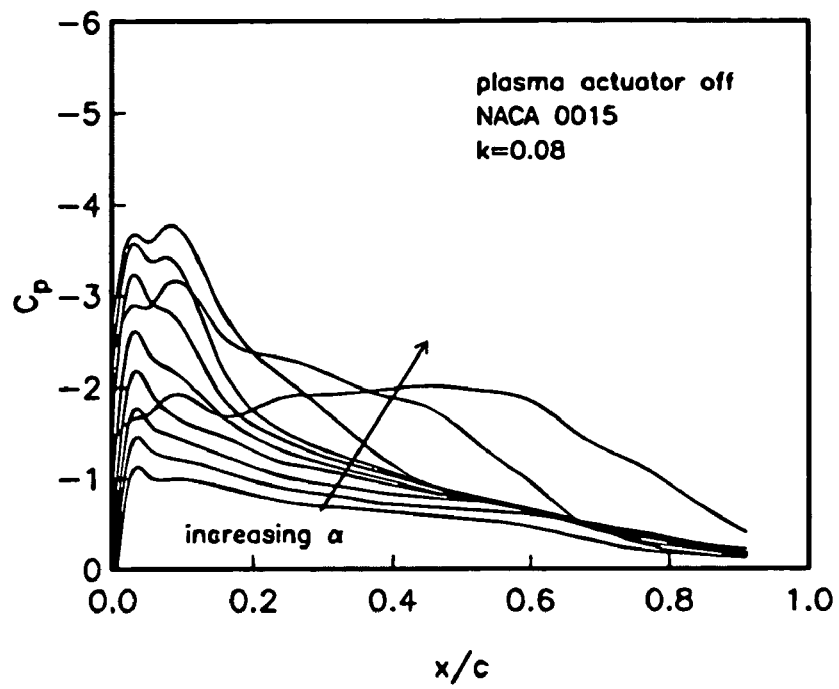
FIGS. 9e and 9f illustrate the pressure coefficient versus the chordwise distance for an oscillating airfoil provided with a plasma actuator according to the present invention.
Figure 9F:
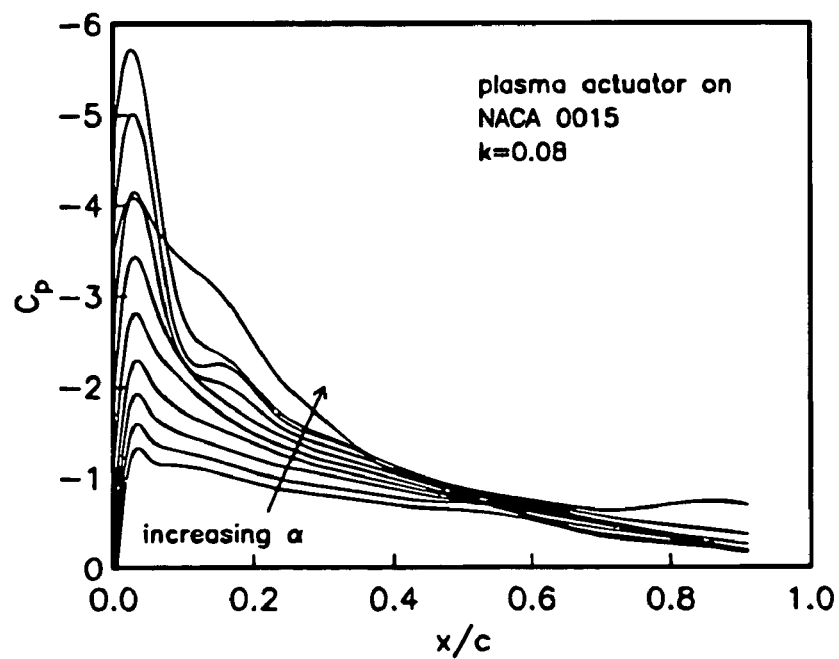

The repetition of this cycle results in a lift-cycle hysteresis. The plasma actuator 1 was operated in steady and unsteady mode to determine its ability to control the oscillatory lift cycle and the lift-cycle hysteresis. FIGS. 9e and 9f illustrate the pressure coefficient as a function of chordwise distance (x/c) for the case where the angle of attack a was varied between 7° and 25° in 2° increments and k=0.08. FIG. 9e illustrates the coefficient in the case where the plasma actuator is off and FIG. 9f illustrates the case where the plasma actuator is operated in the steady mode.

As shown in FIG. 9e, the pressure coefficient peaks at approximately Cp=−4 at an angle of attack α≈21°. As the oscillating cycle continues, the pressure coefficient diminishes and a broad bulge, which is characteristic of the dynamic stall vortex, appears in the coefficient. Subsequent angles in the cycle show the movement of the bulge towards the trailing edge (x/c=1) that is consistent with the downstream convection of the vortex.

FIG. 9f shows that with the plasma actuator operated in the steady mode, the maximum pressure coefficient Cp is increased to approximately −5.75. In addition, the steady plasma actuator suppresses the formation of the dynamic stall vortex as evidenced by the lack of a bulge in the coefficient Cp at the higher angles of attack.

Figure 9G:
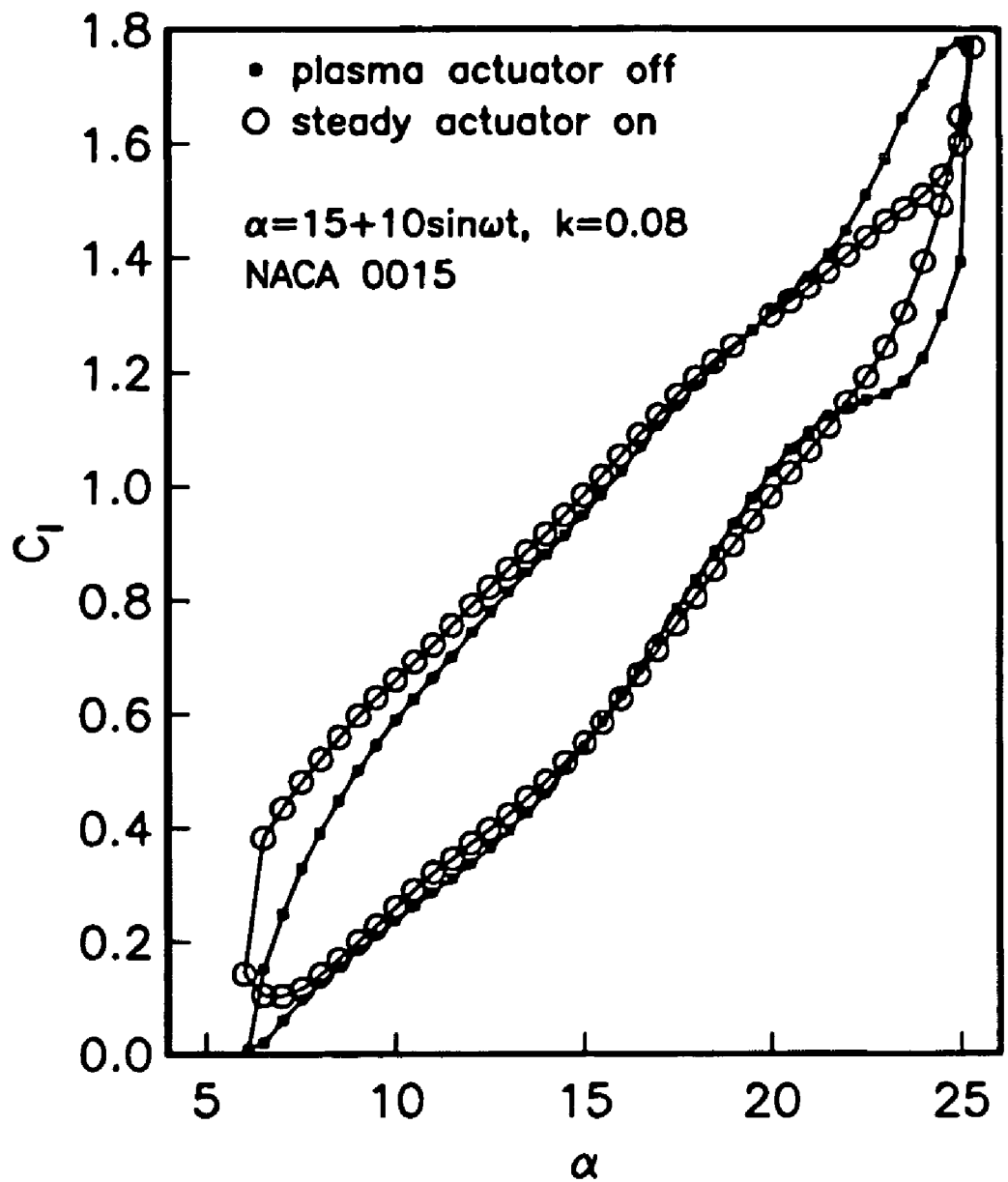
FIG. 9g illustrates the lift coefficient versus angle of attack of an oscillating airfoil provided with a plasma actuator according to the present invention according to steady actuation of the plasma actuator.

FIG. 9g illustrates the lift coefficient for the oscillating cycle shown in FIGS. 9e and 9f. As shown in FIG. 9g, during the pitch up portion of the cycle, there is an almost linear increase in the lift coefficient with an increasing angle of attack, up to approximately α=22°. Above this angle, there is a sharp increase in the lift coefficient, which corresponds to the formation of the dynamic vortex. The initial portion of the pitch down portion of the oscillating cycle shows the remnant of the vortex with a sharp decrease in the lift coefficient past $\alpha_{max}$ the "lobe" in the cycle that persists to approximately 22°.

The use of the plasma actuator in steady mode shows improvements over the case where the plasma actuator is turned off. During the pitch up portion of the oscillating cycle, the lift coefficient is higher with the steady plasma actuator for all angles below α=20°. Furthermore, the steady plasma actuator suppresses the dynamic vortex and the lift associated with it. This is evident from the elimination of the sharp increase in lift that occurs at 22° with the plasma actuator off, and the lobe in the lift cycle in the initial pitch down portion. Past the initial pitch down portion of the oscillating cycle and for the remainder of the pitch down portion, a lift improvement occurs with the steady plasma actuator.

Figures 9H, 9I, 9J, 9K, 9L:
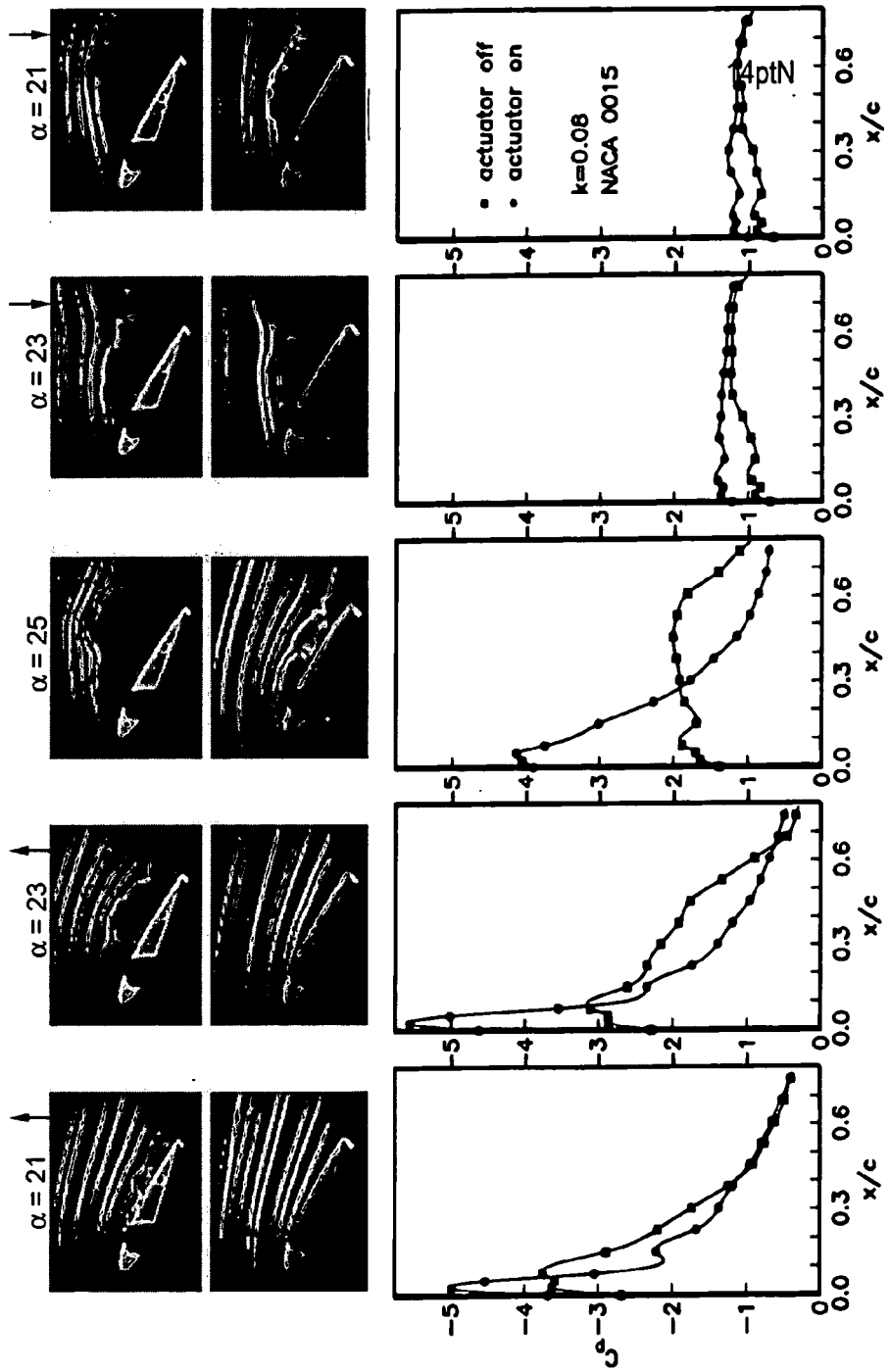
FIGS. 9h-9l illustrate the pressure coefficient of an oscillating airfoil provided with a plasma actuator according to the present invention for angles of attack near and at the peak of the oscillatory cycle and flow visualizations with the plasma actuator on in steady mode and with the plasma actuator off.

FIGS. 9h-9l illustrate the pressure coefficient as a function of the chordwise distance (x/c) and the flow visualizations for the steady plasma actuator for angles of attack near and at the peak of the oscillating cycle. As shown in FIGS. 9h and 9i, at α=21° and α=23° during pitch up, the steady plasma actuator maintains an attached flow at the leading edge and provides a pressure coefficient Cp of approximately −5. As also shown in FIG. 9i, the pressure coefficient does not show the bulge that marks the formation of the dynamic vortex.

At the maximum angle of attack α=25°, shown in FIG. 9j, the lack of the pressure bulge is evident. The flow visualization shows a separation bubble exists with the steady plasma actuator on, but that it is considerably smaller than the separation bubble that exists with the plasma actuator off. The pressure coefficient Cp at the leading edge is still strong, and is larger than the leading edge pressure coefficient when the plasma actuator is off. The flow visualization indicates the outer edge of the airflow is fully separated, but the airflow closer to the surface appears as a coherent feature that is at the proper location and is the proper size to correspond to the dynamic vortex.

Referring to FIGS. 9k and 9l, as the airfoil begins to pitch down in the oscillating cycle, the leading edge pressure coefficient drops further and the pressure bulge convects to the trailing edge of the airfoil. The flow eventually separates, but not as much compared to the case where the plasma actuator is off. The pressure coefficients are more uniform over the airfoil, with higher, i.e. more negative, values within the first one third chord.

Figure 9M:
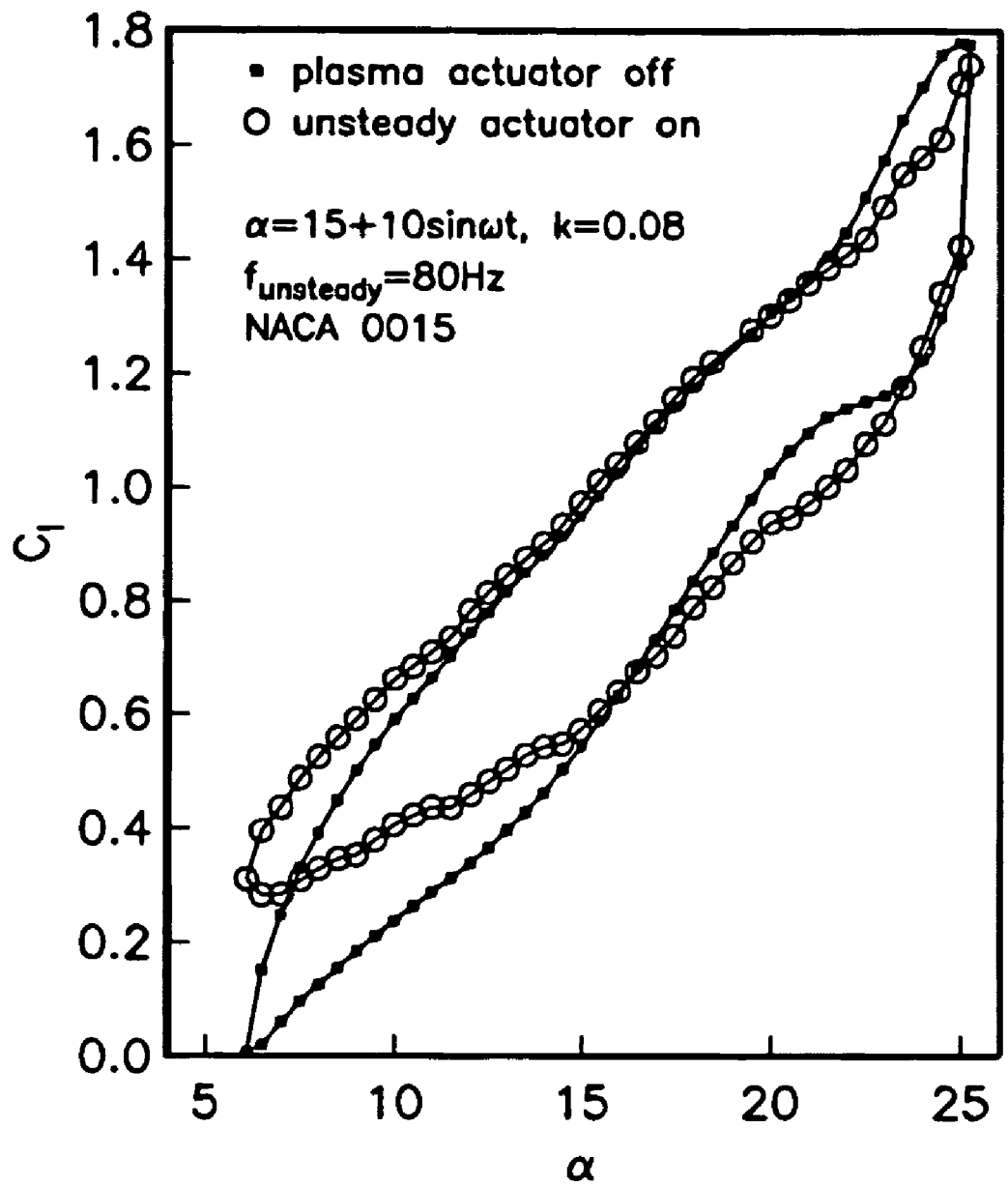
FIG. 9m illustrates the lift coefficient versus angle of attack for an oscillating airfoil including a plasma actuator according to the present invention operated in the unsteady mode at a first forcing frequency.

As show in FIG. 9m, the 80 Hz forcing frequency increased the lift coefficient at lower angles of attack in the pitch down portion of the oscillating cycle. However, at the beginning of the pitch down portion, the lift coefficient is lower than the case where the plasma actuator is off, or the case where the plasma actuator is operated in the steady mode as shown in FIG. 9g. The unsteady actuation also produced an undesirably large drop in the pressure coefficient past $\alpha_{max}$.

Figure 9N:
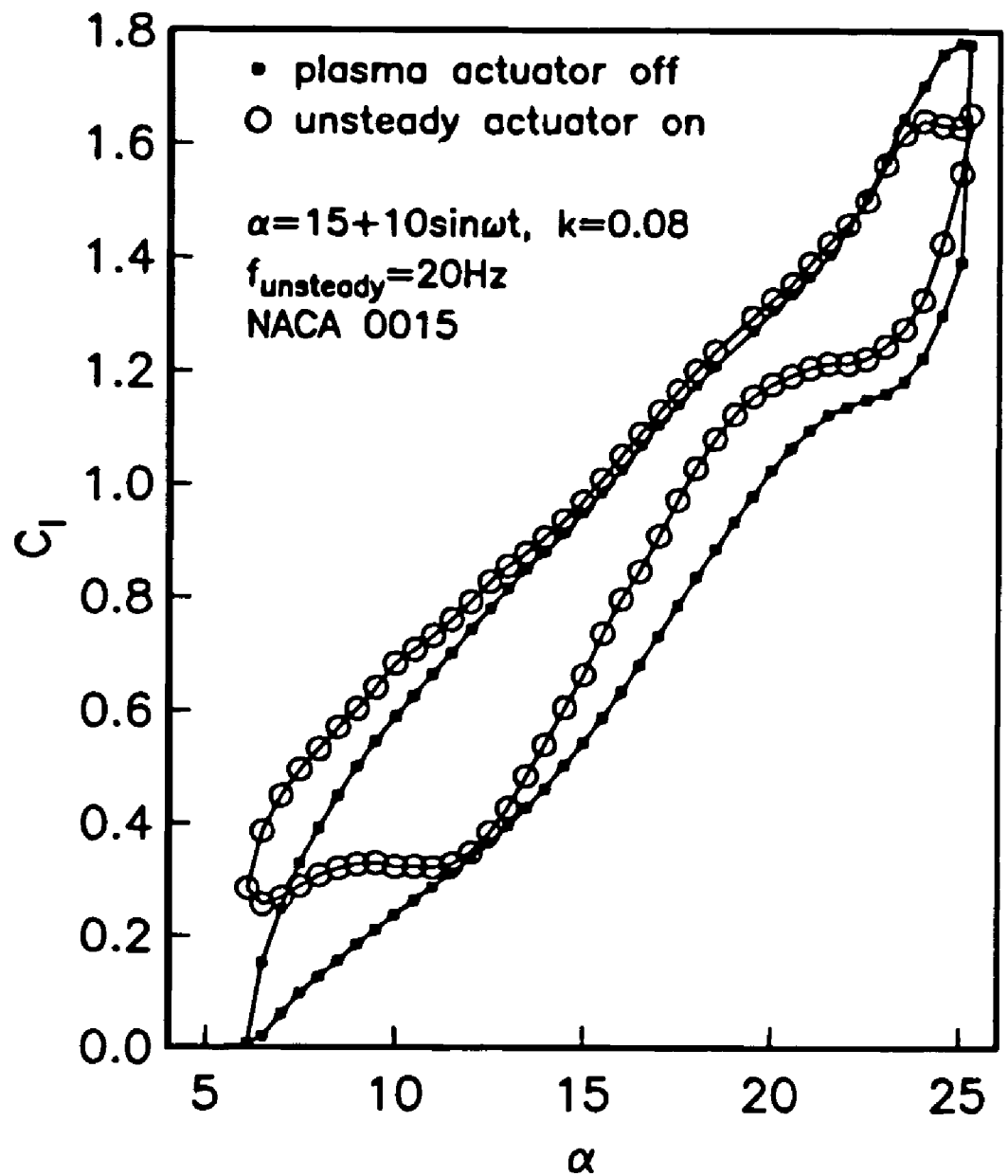
FIG. 9n illustrates the lift coefficient versus angle of attack for an oscillating airfoil including a plasma actuator according to the present invention operated in the unsteady mode at a second forcing frequency.

FIG. 9n illustrates the lift coefficient versus the angle of attack for the case where the forcing frequency is 20 Hz, which is five times higher than the 4 Hz oscillating cycle of the airfoil. The Strouhal number St was equal to 0.25. The 20 Hz forcing frequency excites two vortices per half cycle of the oscillating cycle. The vortices within the separation zone for the unsteady mode where St=0.25 is similar to the operation of the plasma actuator in steady mode where St=1 for a stationary airfoil.

Compared to the 80 Hz forcing frequency shown in FIG. 9m, the 20 Hz forcing frequency produces a higher lift coefficient over the entire pitch down portion of the oscillating cycle. This is most pronounced over the range 25°≧α≧13°. The airfoil also maintains a higher lift coefficient at the bottom of the pitch down portion of the oscillating cycle and this higher lift coefficient persists for the first half of the pitch up portion of the oscillating cycle. These results demonstrate the improved performance of the airfoil provided with the plasma actuator operated in the unsteady mode over the steady mode and over the case where the plasma actuator was turned off; or when no plasma actuator is provided.

FIGS. 9l-9q are flow visualizations for the unsteady operation of the plasma actuator at the 20 Hz forcing frequency. Each of these visualizations for the unsteady actuation of the plasma actuator show a train of three periodic, well defined, vortex-shaped structures on the surface of the airfoil. As shown in FIG. 9q, the unsteady actuation of the plasma actuator results in faster reattachment of the airflow. This is due to the higher lift coefficient at the bottom of the pitch down portion of the oscillating cycle as discussed above with respect to FIG. 9n.

The plasma actuator may be operated in a "smart" mode in which the plasma actuator is operated only during portions of the oscillating cycle α=15°+10° sin ωt and k=0.08 where actuation was expected to improve the lift cycle. A circuit was provided to use the encoder signals 30, 32 as input for selectively turning the plasma actuator on and off. During the time the plasma actuator is on, the plasma actuator may be operated in either the steady or the unsteady mode.

According to one embodiment of the present invention, the plasma actuator was set on during three ranges of the angle of attack in the oscillating cycle of the airfoil: 1) $15° \leq \alpha \leq 20°$ during the pitch up portion; 2) $23° \leq \alpha \leq 24°$ during the pitch up portion, through the peak angle of attack; and 3) $20° \geq \alpha \geq 8°$ during the pitch down portion of the oscillating cycle of the airfoil.

Figure 9R:
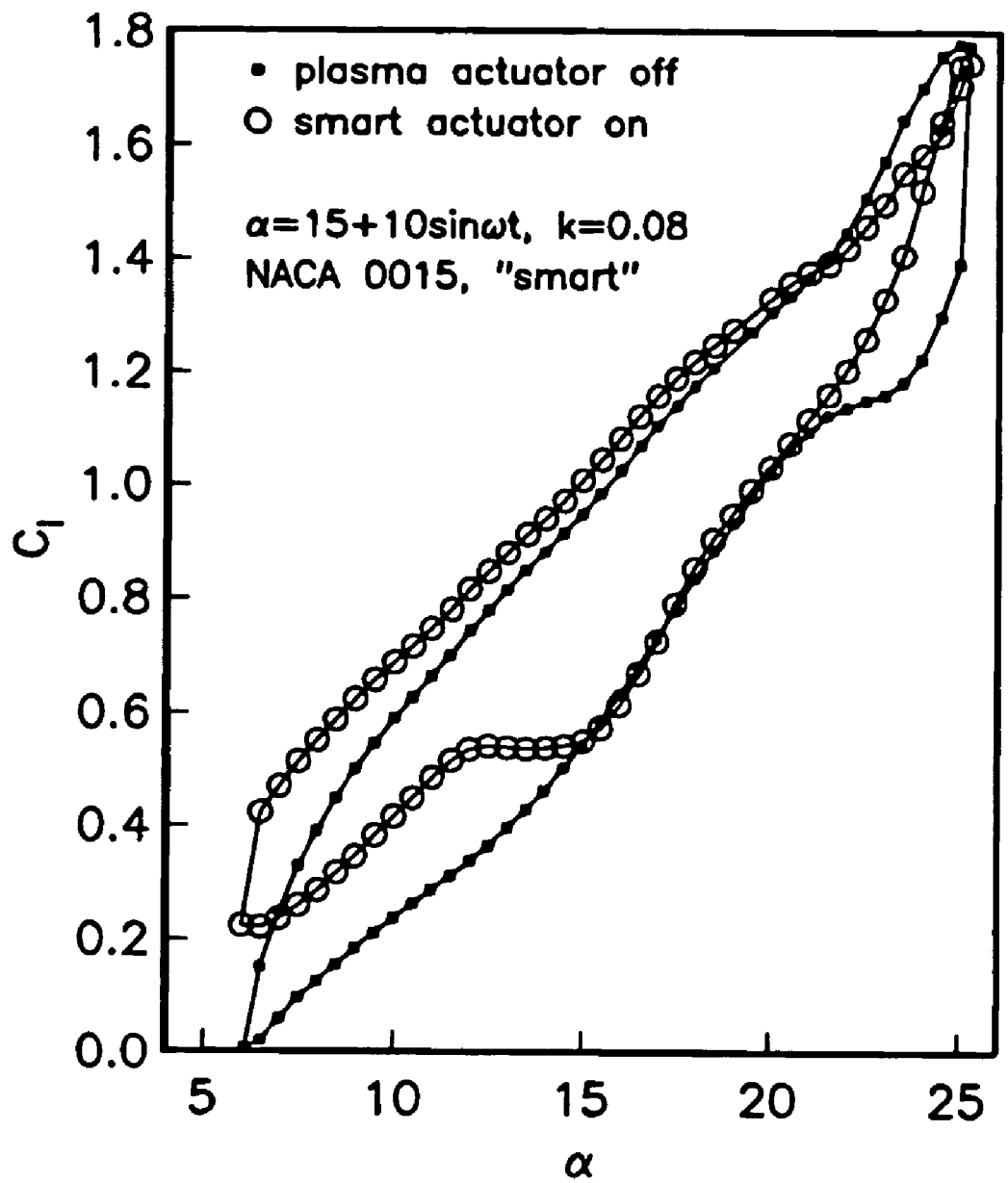
FIG. 9r illustrates the lift coefficient versus the angle of attack for a plasma actuator operated in the smart mode.

Referring to FIG. 9r, the lift coefficient versus the angle of attack for the smart mode of operation of the plasma actuator provides an increase in lift coefficient over the entire oscillating cycle of the airfoil. Following $\alpha_{max}$ the sharp stall that gave the lift coefficient cycle the lobed shape shown in FIGS. 9g and 9m was replaced by a smoother lift decrease with less hysteresis. The maximum lift coefficient was also not lost at higher angles of attack during the pitch up portion of the oscillating cycle, as occurred during operation of the plasma actuator in the steady and unsteady modes where the dynamic stall vortex was suppressed.

FIGS. 9s-9u are flow visualizations for the airflow for the cases where the plasma actuator is off, operated in steady mode, operated in unsteady mode, and operated in smart mode.

Although the present invention has been described in relation to various aircraft and surfaces, it should be appreciated that the present invention is not limited thereto. For example, plasma actuators according to the present invention may be employed on other surfaces, such as fuselages, or in non-aircraft applications, such as turbines in power generation.

What is claimed is:

1. A vertical take-off and vertical landing rotor aircraft comprising:
a surface over which a turbulent vortex generating airflow passes when in use, the turbulent flow being generated by a movement of the surface and a velocity of the airflow relative to the surface is greater than about 10 m/s, and
a plasma actuator configured to generate a plasma above the surface of the vertical take-off and vertical landing rotor aircraft, the plasma coupling a directed momentum into the air surrounding the surface of the vertical take-off and vertical landing rotor aircraft to reduce separation of the airflow from the surface of the vertical take-off and vertical landing rotor aircraft,
wherein the plasma actuator comprises:
a dielectric,
a first electrode on a first side of the dielectric, the first electrode having a first surface in contact with the dielectric and a second surface opposite the first surface exposed to the surrounding air,
a second electrode covered by a second side of the dielectric, and
an alternating current voltage source connected between the first and second electrodes, and
wherein an amount of separation of the turbulent vortex generating airflow from the surface of the vertical take-off and vertical landing rotor aircraft depends on a velocity of the airflow and a frequency of the alternating current voltage source, wherein based upon the velocity of airflow, a frequency of the alternating current voltage source is selected so as to reduce the amount of separation of the airflow from the surface of the vertical take-off and vertical landing rotor aircraft.

2. The aircraft according to claim 1, wherein the dielectric is polyimide tape.

3. The aircraft according to claim 1, wherein the dielectric is ceramic.

4. The aircraft according to claim 1, wherein each of the first and second electrodes is a copper foil.

5. The aircraft according to claim 1, wherein edges of the first and second electrodes overlap.

6. The aircraft according to claim 1, wherein the surface is provided on an airfoil.

7. The aircraft according to claim 6, wherein the aircraft is a tilt-rotor aircraft and the airfoil is a wing.

8. The aircraft according to claim 7, wherein the wing includes a first section and a second section, the second section being pivotable with respect to the first section, and the plasma actuator is provided on the second section.

9. The aircraft according to claim 6, wherein the aircraft is a helicopter and the airfoil is a rotor.

10. The aircraft according to claim 6, wherein the plasma actuator is configured to generate a plasma over essentially an entire spanwise dimension of the airfoil.

11. The aircraft according to claim 6, wherein the plasma actuator is provided on a leading edge of the airfoil.

12. The aircraft according to claim 1, wherein the surface is provided on a fuselage of the aircraft.

13. The aircraft according to claim 1, wherein the surface is provided on a nacelle of the aircraft.

14. The aircraft according to claim 1, wherein the alternating current voltage source is configured to apply voltage between the first and second electrodes at a steady frequency.

15. The aircraft according to claim 1, wherein the alternating current voltage source is configured to apply a voltage between the first and second electrodes at an unsteady frequency.

16. The aircraft according to claim 1, wherein the alternating current voltage source is configured to selectively apply a voltage between the first and second electrodes at a steady frequency or an unsteady frequency.

17. The aircraft according to claim 1, wherein a plurality of plasma actuators are provided on the surface.

18. The aircraft according to claim 1, wherein the frequency is selected such that a Strouhal number depending upon the frequency and the velocity of the airflow is approximately unity.

19. A method of reducing separation of a turbulent vortex generating airflow from a surface of a vertical take-off and vertical landing rotor aircraft, the comprising:
applying an alternating current voltage between a first and a second electrodes at a steady frequency or an unsteady frequency, the first electrode having a first surface in contact with a first side of a dielectric and a second surface opposite the first surface exposed to surrounding air, the second electrode having a surface in contact with a second side of the dielectric;
generating a plasma in air surrounding the surface of the vertical take-off and vertical landing rotor aircraft at a position where the airflow would separate from the surface of the vertical take-off and vertical landing rotor aircraft in the absence of the plasma, a velocity of the airflow relative to the surface is greater than about 10 m/s; and selecting a frequency of the alternating current voltage source based upon a velocity of the turbulent vortex generating airflow passing over the surface of the vertical take-off and vertical landing rotor aircraft so as to reduce an amount of separation of the airflow from the surface of the vertical take-off and vertical landing rotor aircraft.

20. A method according to claim 19, further comprising:
oscillating the surface; and
applying an alternating current voltage between the first and second electrodes at a steady frequency or an unsteady frequency.

21. A method according to claim 20, wherein applying the alternating current voltage comprises applying the alternating current voltage selectively during the oscillation of the surface.

22. A method according to claim 19, wherein the frequency is selected such that a Strouhal number depending upon the frequency and the velocity of the airflow is approximately unity.

23. A vertical take-off and vertical landing rotor aircraft comprising:
a surface over which a turbulent vortex generating airflow passes when in use, the turbulent flow being generated by a movement of the surface and a velocity of the airflow relative to the surface is greater than about 10 m/s, and
a plasma actuator configured to generate a plasma above the surface of the vertical take-off and vertical landing rotor aircraft, the plasma coupling a directed momentum into the air surrounding the surface of the vertical take-off and vertical landing rotor aircraft to reduce separation of the airflow from the surface of the vertical take-off and vertical landing rotor aircraft,
wherein the plasma actuator comprises:
a dielectric,
a first electrode on a first side of the dielectric, the first electrode having a first surface in contact with the dielectric and a second surface opposite the first surface exposed to the surrounding air,
a second electrode covered by a second side of the dielectric, and
an alternating current voltage source connected between the first and second electrodes, and
wherein an amount of separation of the turbulent vortex generating airflow from the surface of the vertical take-off and vertical landing rotor aircraft depends on a velocity of the airflow and a frequency of the alternating current voltage source, and based upon the velocity of the airflow, a frequency of the alternating current voltage source is selected so as to reduce the amount of separation of the airflow from the surface of the vertical take-off and vertical landing rotor aircraft.

* * * * *